(12) United States Patent
Goto et al.

(10) Patent No.: US 12,429,972 B2
(45) Date of Patent: Sep. 30, 2025

(54) POSITION DETECTOR, INTEGRATED CIRCUIT, AND POSITION DETECTION METHOD

(71) Applicant: Wacom Co., Ltd., Saitama (JP)

(72) Inventors: Fumitaka Goto, Saitama (JP); Hiroshi Mizuhashi, Saitama (JP); Takaya Oyama, Saitama (JP); Yoshihisa Sugiyama, Saitama (JP); Joo Hoon Lee, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/734,895

(22) Filed: Jun. 5, 2024

(65) Prior Publication Data

US 2025/0004587 A1 Jan. 2, 2025

(30) Foreign Application Priority Data

Jun. 28, 2023 (JP) .................................. 2023-106538
Jan. 12, 2024 (JP) .................................. 2024-003593

(51) Int. Cl.
*G06F 3/041* (2006.01)
*G06F 3/0354* (2013.01)
*G06F 3/038* (2013.01)
*G06F 3/046* (2006.01)

(52) U.S. Cl.
CPC ...... *G06F 3/04162* (2019.05); *G06F 3/03545* (2013.01); *G06F 3/0383* (2013.01); *G06F 3/046* (2013.01)

(58) Field of Classification Search
CPC ............. G06F 3/04162; G06F 3/03545; G06F 3/0383; G06F 3/046; G06F 3/0442
See application file for complete search history.

(56) References Cited

U.S. PATENT DOCUMENTS 8,913,041 B2 12/2014 Fukushima et al.
2022/0164081 A1* 5/2022 Lee ........................ H02J 50/12

FOREIGN PATENT DOCUMENTS

JP 5534419 B2 7/2014

* cited by examiner

*Primary Examiner* — Matthew A Eason
*Assistant Examiner* — Chayce R Bibbee
(74) *Attorney, Agent, or Firm* — Seed Intellectual Property Law Group LLP

(57) ABSTRACT

Provided is a position detector including a coil configured to function as a sensor and including a transfer coil that transfers an alternating magnetic field based on a transfer signal to a position indicator, and a signal processing circuit connected to the coil and configured to detect a pen signal generated by the position indicator, generate the transfer signal with a frequency based on frequency information of the detected pen signal, and transfer the transfer signal to the transfer coil.

8 Claims, 17 Drawing Sheets

FREQUENCY
CHARACTERISTICS

VOLTAGE
WAVEFORM

FREQUENCY
CHARACTERISTICS

VOLTAGE
WAVEFORM

POSITION DETECTOR, INTEGRATED CIRCUIT, AND POSITION DETECTION METHOD

BACKGROUND

Technical Field

The present disclosure relates to a position detector, an integrated circuit, and a position detection method.

Description of the Related Art

In recent years, an input apparatus different from a mouse or the like is used as an input device of a personal computer, a tablet terminal, etc.

This type of input apparatus includes, for example, a pen-shaped position indicator and a position detection apparatus including an input area for using the position indicator to perform a pointing operation or to input a character, a figure, etc.

The position indicator includes an electric circuit for detecting the pen pressure.

The electric circuit for detecting the pen pressure in the position indicator includes a resonant circuit including a position indication coil and a resonant capacitor, in which a variable capacitor is connected in parallel to the resonant capacitor, as described in, for example, Japanese Patent No. 5534419.

The variable capacitor includes a rod-shaped member, and the variable capacitor is attached to another end side of a core body in which one end side is an indication unit playing a role of a pen tip.

The electric circuit for detecting the pen pressure in the position indicator uses the characteristics of the variable capacitor that the capacitance value changes when the pen pressure is applied to the indication unit. The electric circuit outputs the change in the pen pressure as a change in the resonance frequency output from the electric circuit.

The position detection apparatus detects, as a phase difference, the change in the resonance frequency output from the electric circuit of the position indicator.

Therefore, the conventional position detection apparatus can detect the pen pressure of the position indicator just by using: a signal generator including an oscillator and a current driver, the oscillator being configured to generate a transfer signal with a predetermined single frequency; and a synchronous detection circuit that detects, as a change in the phase, a change in the frequency of a pen signal with respect to a transmission signal, the pen signal being detected by using the signal with the frequency supplied from the oscillator.

When the pen pressure is not applied to the indication unit of the position indicator, a pen signal with large amplitude can be obtained from the electric circuit of the position indicator by bringing the resonance frequency output from the electric circuit of the position indicator into line with the single frequency generated in the position detection apparatus (see FIGS. 14A, 14B, and 15B).

However, when the resonance frequency of the pen signal output from the electric circuit of the position indicator is changed after the pen pressure is applied to the indication unit of the position indicator, the resonance frequency output from the electric circuit of the position indicator does not coincide with the single frequency generated in the position detection apparatus (see FIG. 15A).

That is, there is a phenomenon that the amplitude of the pen signal obtained from the electric circuit of the position indicator is attenuated when the pen pressure is applied to the indication unit of the position indicator (see FIG. 15B).

In addition, the position detector generates the transfer signal with the single frequency for a certain period ("TX period" in FIG. 15B) and then detects the resonance frequency of the pen signal output from the electric circuit of the position indicator in a period ("RX period" in FIG. 15B) of stopping the generation of the transfer signal with the single frequency.

Therefore, in the detection process of the resonance frequency of the pen signal in the position detector, the detection process of the resonance frequency of the pen signal is executed in a state in which the degree of attenuation of the amplitude of the pen signal is further increased.

As described above, the amplitude of the pen signal obtained from the electric circuit of the position indicator is attenuated when the pen pressure is applied to the indication unit of the position indicator in the technique described in Japanese Patent No. 5534419, etc. Therefore, the S/N (signal to noise ratio) of the pen signal obtained from the electric circuit of the position indicator may be reduced, and this may reduce the position detection accuracy of the position indicator or reduce the detection accuracy of the pen pressure.

BRIEF SUMMARY

The present disclosure has been made in view of the problem, and an object of the present disclosure is to provide a position detector, an integrated circuit, and a position detection method that suppress the attenuation of the amplitude of a pen signal obtained from an electric circuit of a position indicator.

First Aspect: One or more embodiments of the present disclosure propose a position detector including a coil configured to function as a sensor and including a transfer coil that transfers an alternating magnetic field based on a transfer signal to a position indicator, and a signal processing circuit connected to the coil and configured to detect a pen signal generated by the position indicator, generate the transfer signal with a frequency based on frequency information of the detected pen signal, and transfer the transfer signal to the transfer coil.

Second Aspect: One or more embodiments of the present disclosure propose an integrated circuit that detects a position indicated by a position indicator, in which the integrated circuit includes a plurality of electrodes that function as a sensor, the integrated circuit is connected to a coil including a transfer coil that transfers an alternating magnetic field based on a transfer signal to the position indicator, and the integrated circuit detects a pen signal generated by the position indicator, generates the transfer signal with a frequency based on frequency information of the detected pen signal, and transfers an alternating magnetic field to the position indicator through the coil.

Third Aspect: One or more embodiments of the present disclosure propose a position detection method in a position detector, the position detection method including a first step of transmitting, by the position detector, a first signal to a position indicator, a second step of transmitting, by the position indicator, a second signal to the position detector, a third step of detecting, by the position detector, frequency information from the second signal, a fourth step of generating, by the position detector, a third signal with a frequency different from the first signal based on the frequency information detected in the third step, and a fifth step of transmitting, by the position detector, the third signal generated in the fourth step to the position indicator.

Fourth Aspect: One or more embodiments of the present disclosure propose a position detector including a detection coil configured to function as a sensor, a transfer coil that transfers an alternating magnetic field based on a transfer signal to a position indicator, and a signal processing circuit connected to the detection coil and the transfer coil and configured to detect a pen signal generated by the position indicator, generate the transfer signal with a frequency based on frequency information of the detected pen signal, and transfer the transfer signal to the transfer coil.

According to one or more embodiments of the present disclosure, there is an advantageous effect that the attenuation of the amplitude of the pen signal obtained from the electric circuit of the position indicator can be suppressed, to thereby suppress the reduction in the position detection accuracy of the position indicator, the reduction in the detection accuracy of the pen pressure, etc.

DETAILED DESCRIPTION

Embodiments of the present disclosure will now be described with reference to FIGS. 1 to 13, 16, and 17.

First Embodiment

A position detector 1 of the present embodiment will be described with reference to FIGS. 1 to 7B.

Note that an input apparatus including the position detector 1 of the present embodiment will be illustrated to describe the position detector 1 of the present embodiment.

Configuration of Input Apparatus

Figure 1:
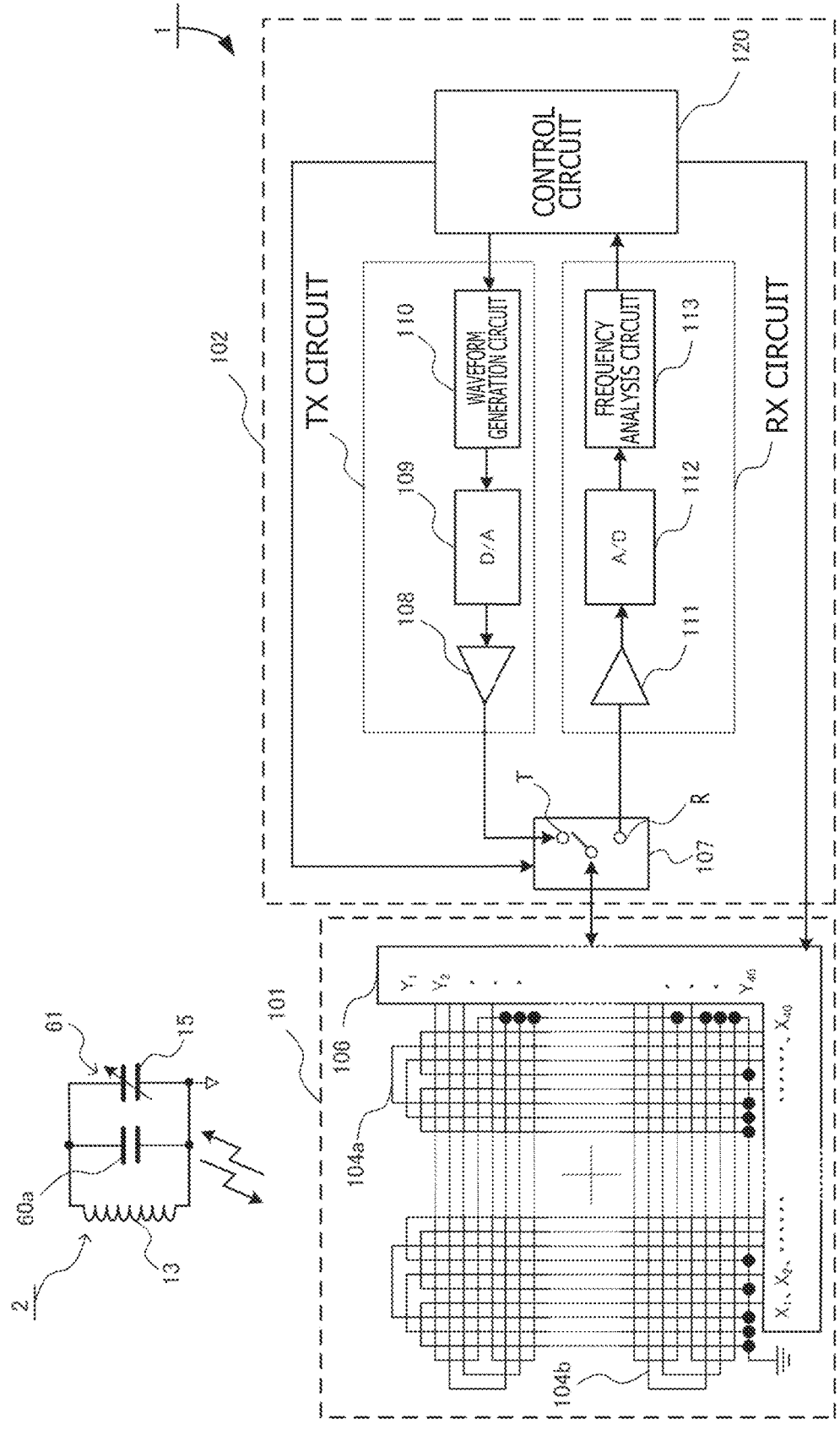
FIG. 1 depicts a configuration of an input apparatus according to a first embodiment of the present disclosure.

As illustrated in FIG. 1, the input apparatus includes the position detector 1 of the present embodiment and a position indicator 2.

Configuration of Position Indicator 2

The position indicator 2 is configured to use an electromagnetic resonance system to indicate the position of the position indicator 2 to the position detector 1.

As illustrated in FIG. 1, the position indicator 2 includes a resonant circuit 61 including: a position indication coil 13; a resonant capacitor 60a connected in parallel to the position indication coil 13; and a variable capacitor 15 connected in parallel to the resonant capacitor 60a.

The resonant circuit 61 including the variable capacitor 15 resonates with a transfer signal received from the position detector 1 described later, to deliver energy.

The position indicator 2 transmits a resonance signal detected by the resonant circuit 61 to the position detector 1, to thereby indicate the position of the position indicator 2 to the position detector 1.

Configuration of Position Detector 1

The position detector 1 includes a position detection coil 101 and a signal processing circuit 102.

An X-axis direction loop coil group 104a and a Y-axis direction loop coil group 104b as a sensor are layered in the position detection coil 101.

The X-axis direction loop coil group 104a and the Y-axis direction loop coil group 104b form the position detection coil 101.

Each of the loop coil groups 104a and 104b includes, for example, 40 rectangular loop coils.

Loop coils included in the loop coil groups 104a and 104b are lined up at equal intervals and sequentially arranged on top of each other.

The position detector 1 includes a selection circuit 106 connected to the X-axis direction loop coil group 104a and the Y-axis direction loop coil group 104b.

The selection circuit 106 sequentially selects one loop coil of the two loop coil groups 104a and 104b.

The signal processing circuit 102 includes a switch connection circuit 107, a transmission amplifier 108, a D/A (digital-to-analog) conversion circuit 109, a waveform generation unit 110, a reception amplifier 111, an A/D (analog-to-digital) conversion circuit 112, a frequency analysis unit 113, and a control unit 120.

A constituent block including the transmission amplifier 108, the D/A conversion circuit 109, and the waveform generation unit 110 will be referred to as a "TX unit," and a constituent block including the reception amplifier 111, the A/D conversion circuit 112, and the frequency analysis unit 113 will be referred to as an "RX unit."

The switch connection circuit 107 switches connection points (transmission side terminal T and reception side terminal R in FIG. 1) to be connected to the loop coils selected by the selection circuit 106 based on a control signal from the control unit 120 described later.

The transmission amplifier 108 is connected to the transmission side terminal T of the connection points, and the reception amplifier 111 is connected to the reception side terminal R.

Figure 4A:
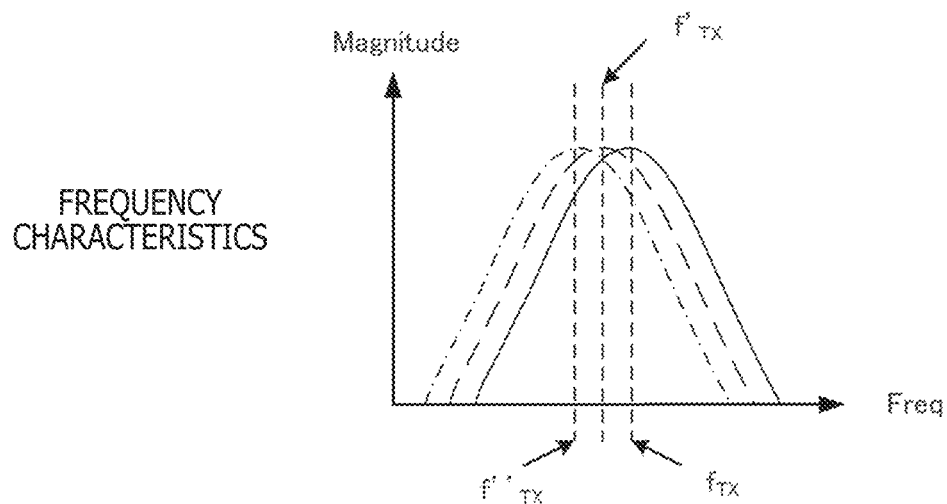
FIG. 4A is a diagram illustrating frequency characteristics of a TX signal according to the first embodiment of the present disclosure.

The waveform generation unit 110 generates a transfer signal (hereinafter, referred to as a "TX signal") to be supplied to a transfer coil 104 as the position detection coil 101 as illustrated in FIG. 4A based on a control signal obtained from the frequency analysis unit 113 described later through the control unit 120 described later.

Figure 2:
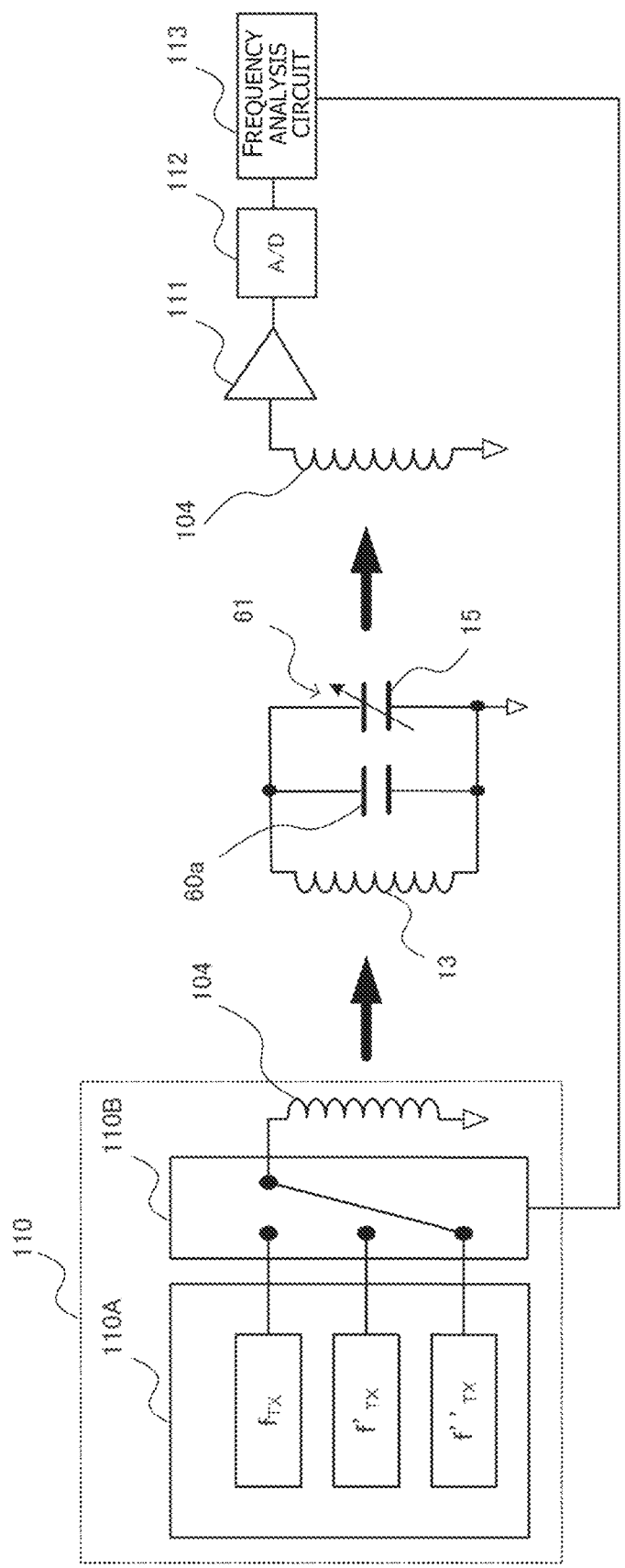
FIG. 2 depicts an operating principle of a position detector according to the first embodiment of the present disclosure.

The waveform generation unit 110 includes a signal generation unit 110A and a multiplexer (MUX) 110B as illustrated in FIG. 2.

The signal generation unit 110A includes a plurality of signal generators that generate a plurality of transfer signals with different frequencies.

The signal generation unit 110A generates, for example, a plurality of transfer signals with three different frequencies fTX, f'TX, and f"TX as illustrated in FIG. 2.

Output ends of the plurality of signal generators of the signal generation unit 110A are separately connected to a plurality of input ends of the multiplexer 110B, and the output ends are connected to an output end of the multiplexer 110B based on a control signal from the control unit 120 described later.

The multiplexer 110B receives and multiplexes the plurality of transfer signals with different frequencies from the signal generation unit 110A and outputs a TX signal with a unique frequency.

Specifically, the multiplexer 110B outputs a TX signal corresponding to the frequency/phase of a pen signal (hereinafter, referred to as an "RX signal") input from the frequency analysis unit 113 described later based on frequency/phase information of the RX signal that is analyzed by the frequency analysis unit 113 described later and that is detected by the detection coil 104 as the position detection coil 101.

Figure 4B:
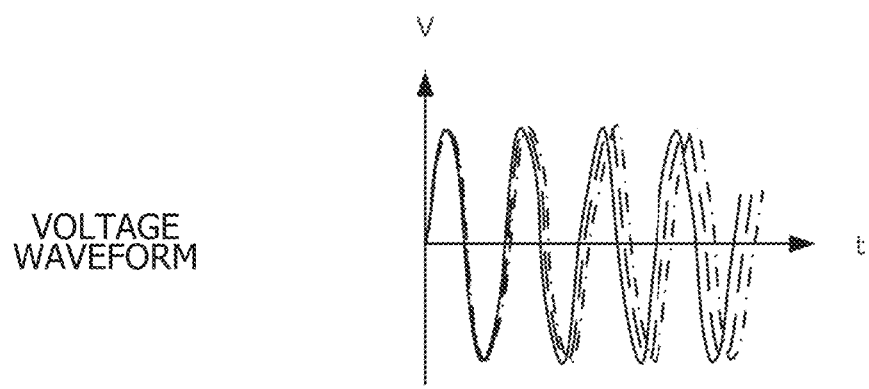
FIG. 4B is a diagram illustrating a voltage waveform of the TX signal according to the first embodiment of the present disclosure.

An analog voltage waveform of the TX signal transferred to the position detector 1 through the transfer coil 104 as the position detection coil 101 is as illustrated in FIG. 4B.

A digital signal output from the waveform generation unit 110 is converted into an analog signal by the D/A conversion circuit 109 and amplified by the transmission amplifier 108. The signal is supplied to the transmission side terminal T of the switch connection circuit 107.

The RX signal detected by the detection coil 104 as the position detection coil 101 is amplified by the reception amplifier 111 through the reception side terminal R of the switch connection circuit 107 and converted into the digital signal by the A/D conversion circuit 112. The signal is supplied to the frequency analysis unit 113.

The frequency analysis unit 113 receives the RX signal converted into the digital signal and executes a discrete Fourier transform process.

The frequency analysis unit 113 outputs, to the control unit 120 described later, the frequency/phase information of the RX signal as an execution result of the discrete Fourier transform process.

Figure 3:
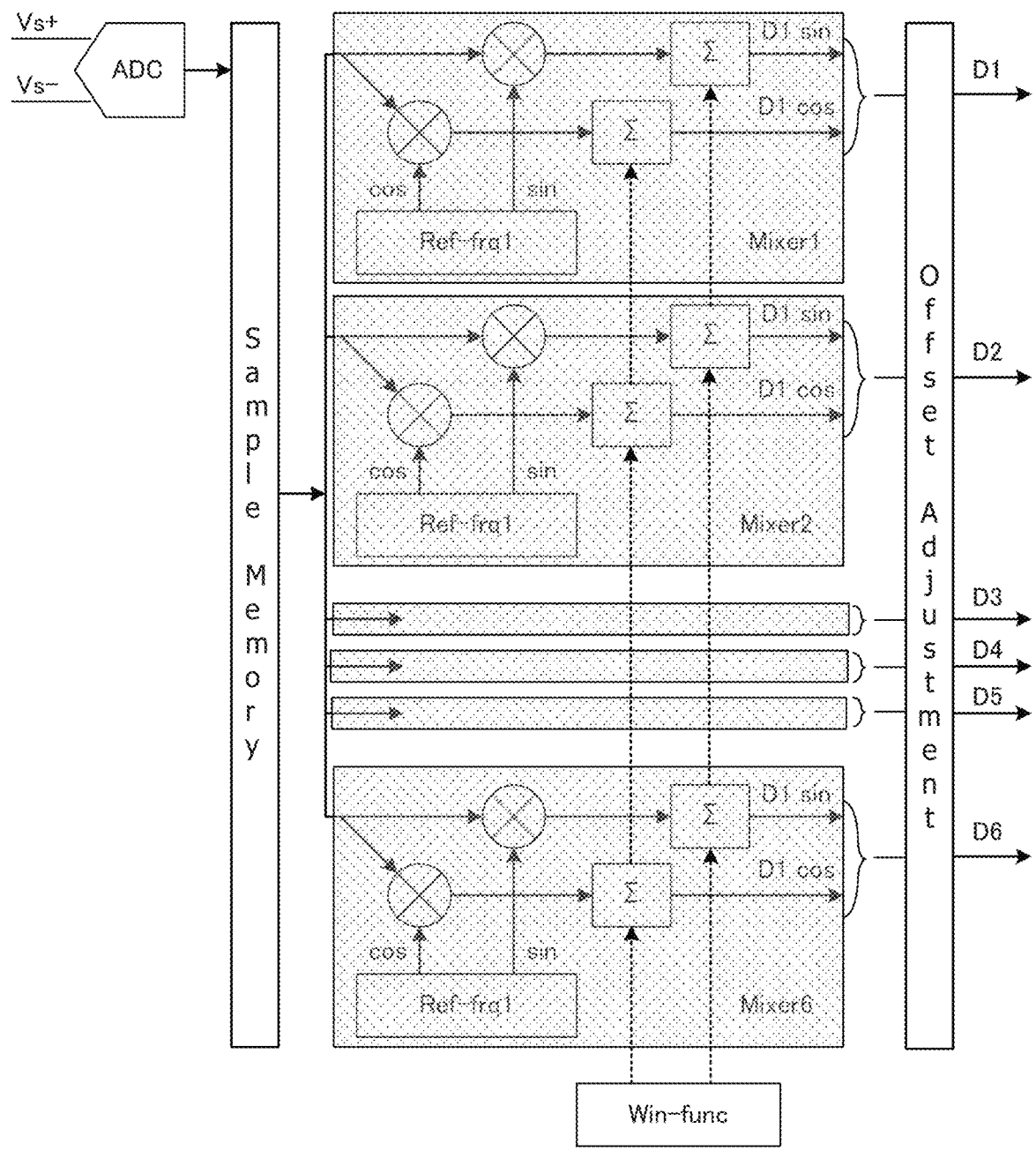
FIG. 3 depicts an example of a configuration of a frequency analysis unit in the position detector according to the first embodiment of the present disclosure.

The frequency analysis unit 113 is, for example, a DFT (discrete Fourier transformer) with one input and six outputs as illustrated in FIG. 3 and is configured to perform frequency analysis of a plurality of discrete frequencies.

The result of the frequency analysis by the frequency analysis unit 113 is fed back as a control signal to the multiplexer 110B of the waveform generation unit 110 as illustrated in FIG. 2.

The control unit 120 controls the entire signal processing circuit 102 based on, for example, a control program stored in a ROM (read only memory) not illustrated.

Specifically, the control unit 120 controls an RX signal reception process, a discrete Fourier transform process in the frequency analysis unit 113, a reception process of the frequency/phase information, a signal multiplexing process in the multiplexer 110B, a signal generation process in the signal generation unit 110A, a transmission process of the TX signal, etc.

The control unit 120 stores, in a memory, the frequency/phase information of the RX signal obtained from the frequency analysis unit 113.

The control unit 120 causes the waveform generation unit 110 to generate, on the basis of the pen signal generated by the position indicator 2, a transfer signal with a frequency that varies according to the frequency of the pen signal.

The control unit 120 controls the action of the multiplexer 110B to transfer an alternating magnetic field to the position indicator 2 through the sensor (104a and 104b).

The control unit 120 controls the action of the multiplexer 110B to generate a transfer signal corresponding to the change in the frequency when the frequency of the pen signal generated by the position indicator 2 has changed from the frequency of the detected pen signal.

The control unit 120 controls the action of the multiplexer 110B to generate the transfer signal at timing before the start of a coordinate calculation process of the position indicator 2.

The control unit 120 causes the multiplexer 110B to generate the transfer signal a plurality of times in one coordinate calculation process and controls the action of the multiplexer 110B to continuously generate the transfer signal with the same frequency at least during the plurality of times of the generation of the transfer signal in one coordinate calculation process.

The control unit 120 generates, in each loop coil of the X-axis direction loop coil group 104a and the Y-axis direction loop coil group 104b, a voltage induced by the pen signal transmitted from the position indicator 2.

The control unit 120 calculates coordinate values of the indicated position in the X-axis direction and the Y-axis direction of the position indicator 2 based on the level of a voltage value of the induced voltage generated in each loop coil.

The control unit 120 detects a pen pressure based on a phase difference between the transmitted transfer signal and the received pen signal.

Process of Position Detector 1

Figure 5:
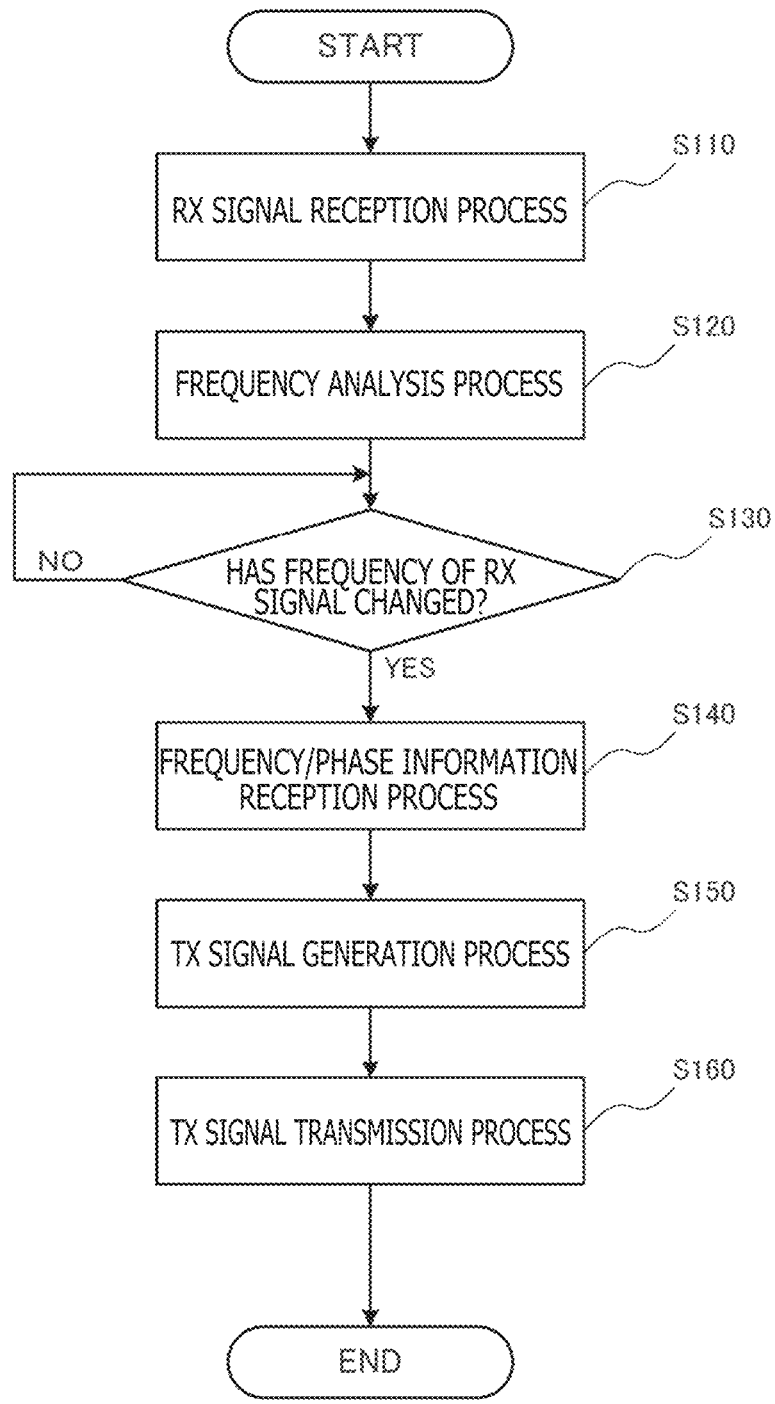
FIG. 5 is a process flow chart of the position detector according to the first embodiment of the present disclosure.
Figure 6:
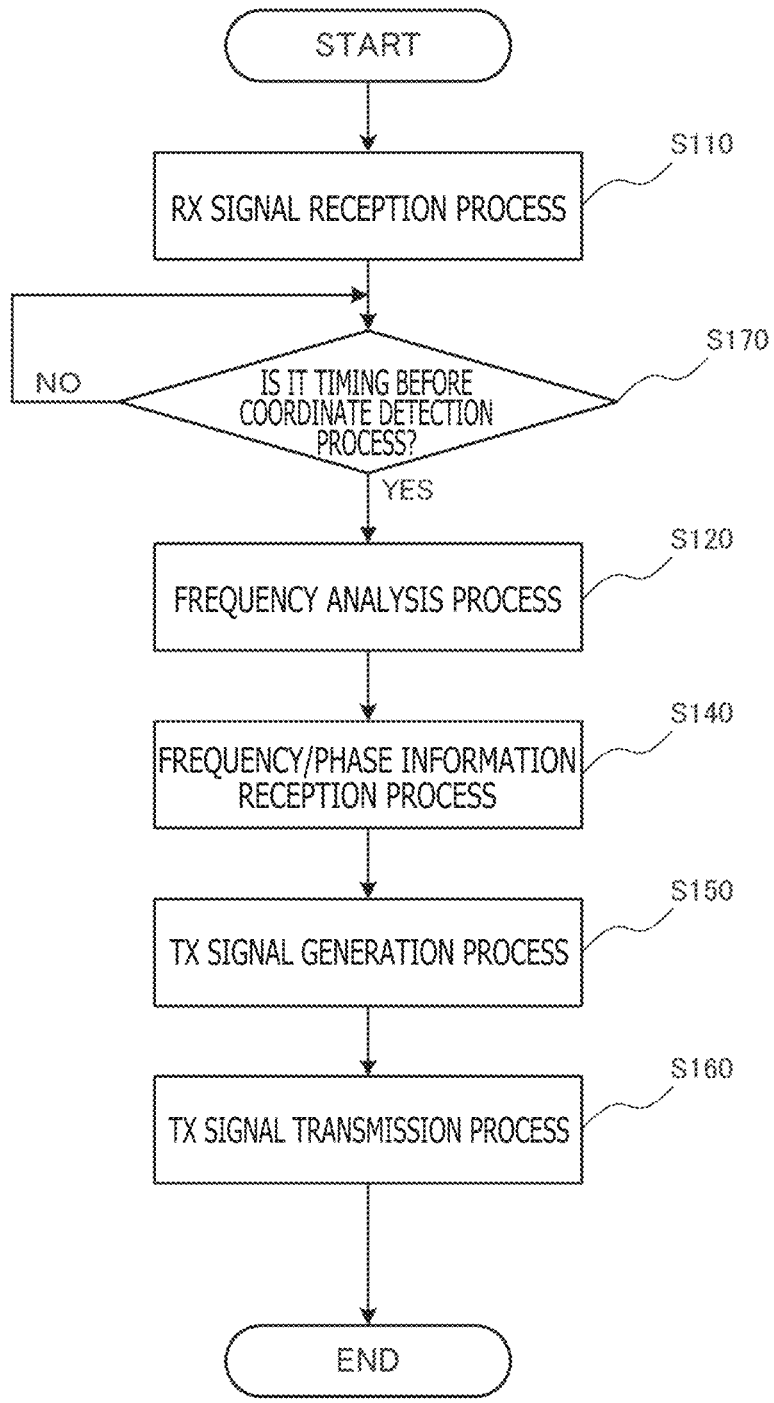
FIG. 6 is a process flow chart of the position detector according to the first embodiment of the present disclosure.

A process of the position detector 1 according to the present embodiment will be described with reference to FIGS. 5 and 6.

Note that a case of starting the process when the frequency/phase information of the RX signal has changed and a case of starting the process at timing before the coordinate calculation process of the position indicator 2 will be separately described.

Case of Starting Process when Frequency/Phase Information of RX Signal has Changed The case of starting the process when the frequency/phase information of the RX signal has changed will be described with reference to FIG. 5.

The control unit 120 causes a signal reception unit to receive the RX signal from the position indicator 2 (step S110).

The RX signal received by the signal reception unit is converted into a desirable digital signal and transferred to the frequency analysis unit 113 through the control unit 120.

The frequency analysis unit 113 receives the RX signal converted into the digital signal and executes the discrete Fourier transform process.

The frequency analysis unit 113 transfers, to the control unit 120, the frequency/phase information of the RX signal as an execution result of the discrete Fourier transform process (step S120).

In this case, the control unit 120 stores, in the memory, the frequency/phase information of the RX signal obtained from the frequency analysis unit 113.

The control unit 120 compares the frequency/phase information of the RX signal in the memory and the frequency/phase information of the RX signal obtained from the frequency analysis unit 113 and determines whether or not the frequency/phase information of the RX signal has changed (step S130).

If the control unit 120 determines that the frequency/phase information of the RX signal has not changed after comparing the frequency/phase information of the RX signal in the memory and the frequency/phase information of the RX signal obtained from the frequency analysis unit 113 ("NO" in step S130), the control unit 120 restores the process and shifts to a standby mode.

If the control unit 120 determines that the frequency/phase information of the RX signal has changed after comparing the frequency/phase information of the RX signal in the memory and the frequency/phase information of the RX signal obtained from the frequency analysis unit 113 ("YES" in step S130), the control unit 120 transmits, to the multiplexer 110B, the frequency/phase information of the RX signal from the frequency analysis unit 113, and the multiplexer 110B receives the transmitted frequency/phase information of the RX signal (step S140).

The signal generation unit 110A generates a plurality of transfer signals with different frequencies.

The multiplexer 110B receives and multiplexes the plurality of transfer signals with different frequencies from the signal generation unit 110A and outputs the TX signal corresponding to the frequency/phase of the RX signal input from the frequency analysis unit 113 (step S150).

The control unit 120 transmits the TX signal to the position indicator 2 through a signal transmission unit.

The TX signal output from the control unit 120 is transmitted to the position detection coil 101 of the position indicator 2 through the switch connection circuit 107 (step S160).

Case of Starting Process at Timing before Coordinate Calculation Process of Position Indicator 2

The case of starting the process at the timing before the coordinate calculation process of the position indicator 2 will be described with reference to FIG. 6.

The control unit 120 causes the signal reception unit to receive the RX signal from the position indicator 2 (step S110).

The RX signal received by the control unit 120 is converted into a desirable digital signal.

The control unit 120 determines whether or not the current processing mode is at the timing before the coordinate detection process (step S170).

If the control unit 120 determines that the current processing mode is not at the timing before the coordinate detection process ("NO" in step S170), the control unit 120 restores the process and shifts to the standby mode.

If the control unit 120 determines that the current processing mode is at the timing before the coordinate detection process ("YES" in step S170), the RX signal received by the signal reception unit is converted into a desirable digital signal and transferred to the frequency analysis unit 113 through the control unit 120.

The frequency analysis unit 113 receives the RX signal converted into the digital signal from the control unit 120 and executes the discrete Fourier transform process.

The frequency analysis unit 113 transfers, to the multiplexer 110B, the frequency/phase information of the RX signal as an execution result of the discrete Fourier transform process (step S120).

In this case, the control unit 120 stores, in the memory, the frequency/phase information of the RX signal obtained from the frequency analysis unit 113.

The multiplexer 110B receives the frequency/phase information of the RX signal from the frequency analysis unit 113 (step S140).

The signal generation unit 110A generates a plurality of transfer signals with different frequencies.

The multiplexer 110B receives and multiplexes the plurality of transfer signals with different frequencies from the signal generation unit 110A and outputs the TX signal corresponding to the frequency/phase of the RX signal input from the frequency analysis unit 113 (step S150).

The control unit 120 transmits the TX signal to the position indicator 2 through the signal transmission unit.

The TX signal output from the control unit 120 is transmitted to the position detection coil 101 of the position indicator 2 through the switch connection circuit 107 (step S160).

Effects

As described above, the position detector 1 of the present embodiment includes: the sensor (for example, X-axis direction loop coil group 104a and Y-axis direction loop coil group 104b) provided with a plurality of electrodes; and the signal processing circuit 102 connected to the sensor (for example, X-axis direction loop coil group 104a and Y-axis direction loop coil group 104b) and configured to detect the pen signal generated by the position indicator 2, generate the transfer signal with the frequency that varies according to the frequency of the detected pen signal, and transfer the alternating magnetic field to the position indicator 2 through the sensor (for example, X-axis direction loop coil group 104a and Y-axis direction loop coil group 104b).

That is, the signal processing circuit 102 of the position detector 1 according to the present embodiment detects the pen signal generated by the position indicator 2, generates the transfer signal with the frequency that varies according to the frequency of the detected pen signal, and transfers the alternating magnetic field to the position indicator 2 through the sensor (for example, X-axis direction loop coil group 104a and Y-axis direction loop coil group 104b).

For example, the position detector 1 of the present embodiment generates the transfer signal with the frequency that varies according to the behavior of the position indicator 2, such as whether or not there is a pen pressure in the position indicator 2, and transfers the transfer signal to the position indicator 2.

More specifically, the position detector 1 of the present embodiment transfers, to the position indicator 2, the transfer signal with the frequency corresponding to the frequency transferred from the position indicator 2 as illustrated in FIG. 4A, for example.

Therefore, the resonance energy supplied to the position indicator 2 is maintained regardless of whether or not there is a pen pressure in the position indicator 2, and the amplitude of the voltage waveform transferred from the position indicator 2 is also maintained as illustrated in FIG. 4B.

In the conventional position indicator 2, when the resonance frequency becomes fPEN due to the pen pressure, the position indicator 2 can obtain only the resonance energy based on the frequency characteristics of fTX, and the resonance signal is attenuated.

Figure 7A:
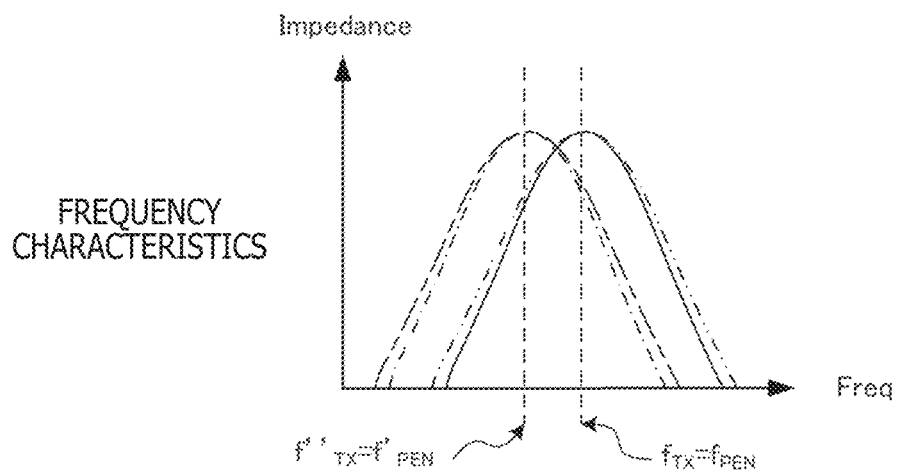
FIG. 7A is a diagram illustrating frequency characteristics of an RX signal according to the first embodiment of the present disclosure.
Figure 7B:
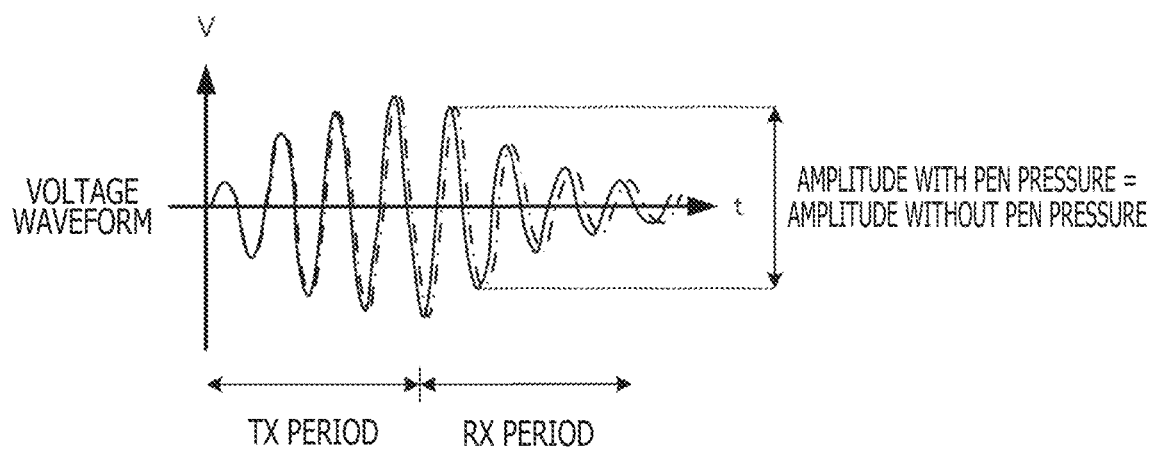
FIG. 7B is a diagram illustrating a voltage waveform of the RX signal according to the first embodiment of the present disclosure.

In the present embodiment, the position indicator 2 can obtain the resonance energy based on the frequency characteristics of f"TX, and the resonance signal is not attenuated as illustrated in FIGS. 7A and 7B. The position indicator 2 can obtain the resonance signal equivalent to when there is no pen pressure.

Therefore, the reduction in the S/N of the pen signal transferred from the position indicator 2 can be suppressed even if the pen pressure is generated in the position indicator 2.

Since the reduction in the S/N of the pen signal transferred from the position indicator 2 can be suppressed, the reduction in the position detection accuracy of the position indicator can be suppressed.

Since the reduction in the S/N of the pen signal transferred from the position indicator 2 can be suppressed, the reduction in the detection accuracy of the pen pressure in the position indicator 2 can be suppressed.

Since the resonance energy supplied to the position indicator 2 is optimized, an improvement in the position detection accuracy of the position indicator 2 in, for example, the hover state can also be expected.

Since the resonance energy supplied to the position indicator 2 is optimized, the reduction in the S/N of the pen signal transferred from the position indicator 2 can be suppressed even if, for example, a magnet or metal housing or the like is deteriorated over time or even if the value of the position indication coil or the resonant capacitor included in the resonant circuit in the position indicator 2 is changed by environmental conditions or the like.

The signal processing circuit 102 of the position detector 1 according to the present embodiment generates the transfer signal corresponding to the change in the frequency when the frequency of the pen signal generated by the position indicator 2 has changed from the frequency of the detected pen signal.

That is, the signal processing circuit 102 of the position detector 1 according to the present embodiment generates the transfer signal corresponding to the change in the frequency of the pen signal generated by the position indicator 2.

For example, the position detector 1 of the present embodiment generates the transfer signal corresponding to the frequency changed according to the behavior of the position indicator 2, such as whether or not there is a pen pressure in the position indicator 2.

More specifically, the position detector 1 of the present embodiment transfers, to the position indicator 2, the transfer signal with the frequency corresponding to the frequency transferred from the position indicator 2 as illustrated in FIG. 4A, for example.

Therefore, the resonance energy supplied to the position indicator 2 is maintained regardless of whether or not there is a pen pressure in the position indicator 2, and the amplitude of the voltage waveform transferred from the position indicator 2 is also maintained as illustrated in FIG. 4B.

In the conventional position indicator 2, when the resonance frequency becomes fPEN due to the pen pressure, the position indicator 2 can obtain only the resonance energy based on the frequency characteristics of fTX, and the resonance signal is attenuated.

In the present embodiment, the position indicator 2 can obtain the resonance energy based on the frequency characteristics of f"TX, and the resonance signal is not attenuated as illustrated in FIGS. 7A and 7B. The position indicator 2 can obtain the resonance signal equivalent to when there is no pen pressure.

Therefore, the reduction in the S/N of the pen signal transferred from the position indicator 2 can be suppressed even if the pen pressure is generated in the position indicator 2.

Since the reduction in the S/N of the pen signal transferred from the position indicator 2 can be suppressed, the reduction in the position detection accuracy of the position indicator can be suppressed.

Since the reduction in the S/N of the pen signal transferred from the position indicator 2 can be suppressed, the reduction in the detection accuracy of the pen pressure in the position indicator 2 can be suppressed.

The signal processing circuit 102 of the position detector 1 according to the present embodiment generates the transfer signal at the timing before the start of the coordinate calculation process of the position indicator 2.

That is, the reduction in the S/N of the pen signal transferred from the position indicator 2 most significantly affects the coordinate calculation process of the position indicator 2.

However, the signal processing circuit 102 of the position detector 1 according to the present embodiment generates the transfer signal at the timing before the start of the coordinate calculation process of the position indicator 2.

Therefore, in the coordinate calculation process of the position indicator 2, the pen signal transferred from the position indicator 2 with suppressed reduction in S/N can be used to execute the coordinate calculation process.

The signal processing circuit 102 of the position detector 1 according to the present embodiment generates the transfer signal at the timing before the start of the coordinate calculation process of the position indicator 2.

Therefore, the start timing of the waveform generation unit 110 and the D/A conversion circuit 109 can be optimized to minimize the power consumption of the waveform generation unit 110 and the D/A conversion circuit 109.

Thus, even if the pen pressure is generated in the position indicator 2, the power consumption can be minimized, and the reduction in the S/N of the pen signal transferred from the position indicator 2 can be suppressed.

Since the reduction in the S/N of the pen signal transferred from the position indicator 2 can be suppressed, the reduction in the position detection accuracy of the position indicator can be suppressed.

Since the reduction in the S/N of the pen signal transferred from the position indicator 2 can be suppressed, the reduction in the detection accuracy of the pen pressure in the position indicator 2 can be suppressed.

The signal processing circuit 102 of the position detector 1 according to the present embodiment is configured to generate the transfer signal a plurality of times in one coordinate calculation process, and the signal processing circuit 102 continuously generates the transfer signal with the same frequency at least during the plurality of times of the generation of the transfer signal in one coordinate calculation process.

For example, in a case of calculating the coordinates of the position indicator 2 in N×N areas of the sensor, that is, in one coordinate calculation process, N X-sensors and N Y-sensors are sensed, that is, the process of generating the transfer signal a plurality of times is executed. The calculation process of the coordinates is executed on the basis of the reception strength distribution of the sensor.

If the frequency of the transfer signal is changed during the sensing of the N X-sensors and the N Y-sensors, that is, during the plurality of times of the generation of the transfer signal in one coordinate calculation process, the amplitude level of the pen signal is changed, and accurate coordinates may not be calculated.

Therefore, the signal processing circuit 102 is configured to generate the transfer signal a plurality of times in one coordinate calculation process, and the signal processing circuit 102 continuously generates the transfer signal with the same frequency at least during the plurality of times of the generation of the transfer signal in one coordinate calculation process. This can prevent the adverse effect of the dynamic change in frequency.

Second Embodiment

A position detector 1A of the present embodiment will be described with reference to FIGS. 8 to 10.

Note that only the configuration of a frequency analysis unit 113A in the position detector 1A of the present embodiment is different from the position detector 1 of the first embodiment, and only the matters regarding the frequency analysis unit 113A will be described.

Configuration of Signal Processing Circuit 102A

Figure 8:
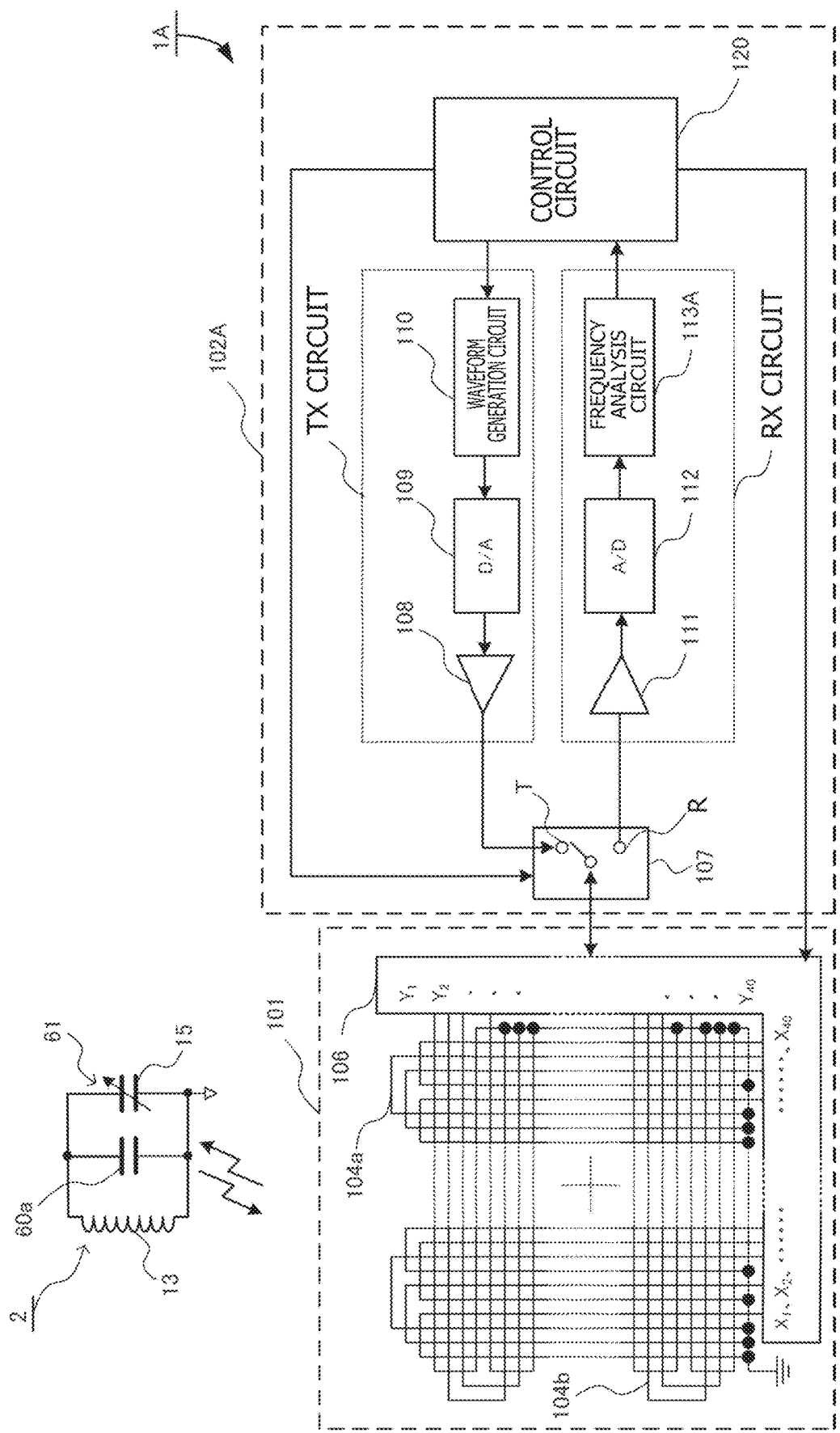
FIG. 8 depicts a configuration of an input apparatus according to a second embodiment of the present disclosure.

As illustrated in FIG. 8, a signal processing circuit 102A of the position detector 1A according to the present embodiment includes the switch connection circuit 107, the transmission amplifier 108, the D/A conversion circuit 109, the waveform generation unit 110, the reception amplifier 111, the A/D conversion circuit 112, the frequency analysis unit 113A, and the control unit 120.

Note that the constituent elements provided with the same reference signs as those of the first embodiment have similar functions, and the constituent elements will not be described in detail.

The frequency analysis unit 113A is configured to perform frequency analysis of a plurality of discrete frequencies.

The frequency analysis unit 113A extracts, as a frequency, a discrete value closest to the peak of the peak values of the pen signal received from the position indicator 2, among the discrete values of the frequency detection.

Figure 9:
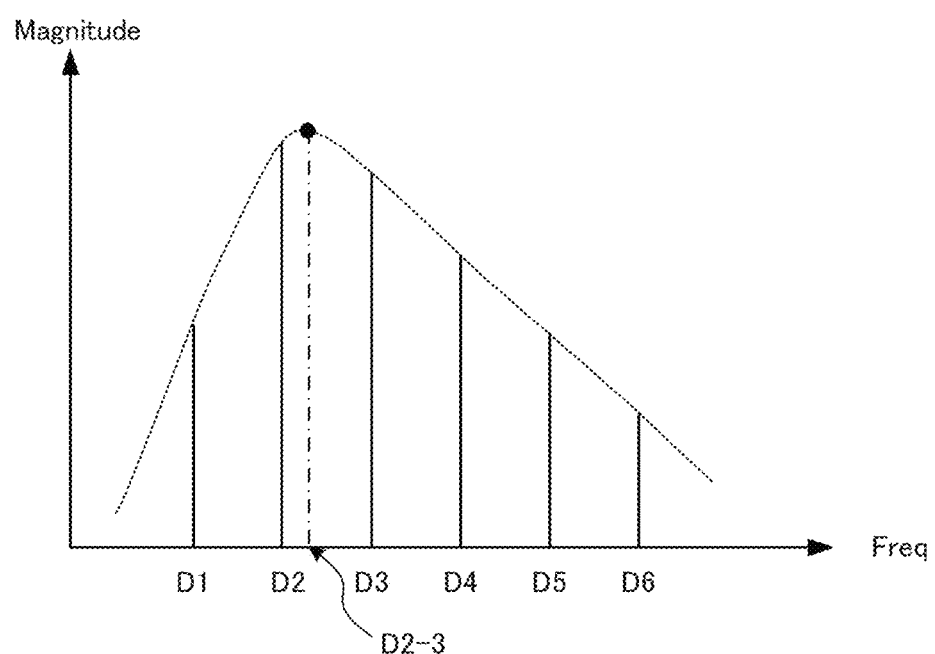
FIG. 9 depicts a relation between output from a frequency analysis unit of a position detector and frequency/phase information transmitted to a multiplexer according to the second embodiment of the present disclosure.
Figure 10:
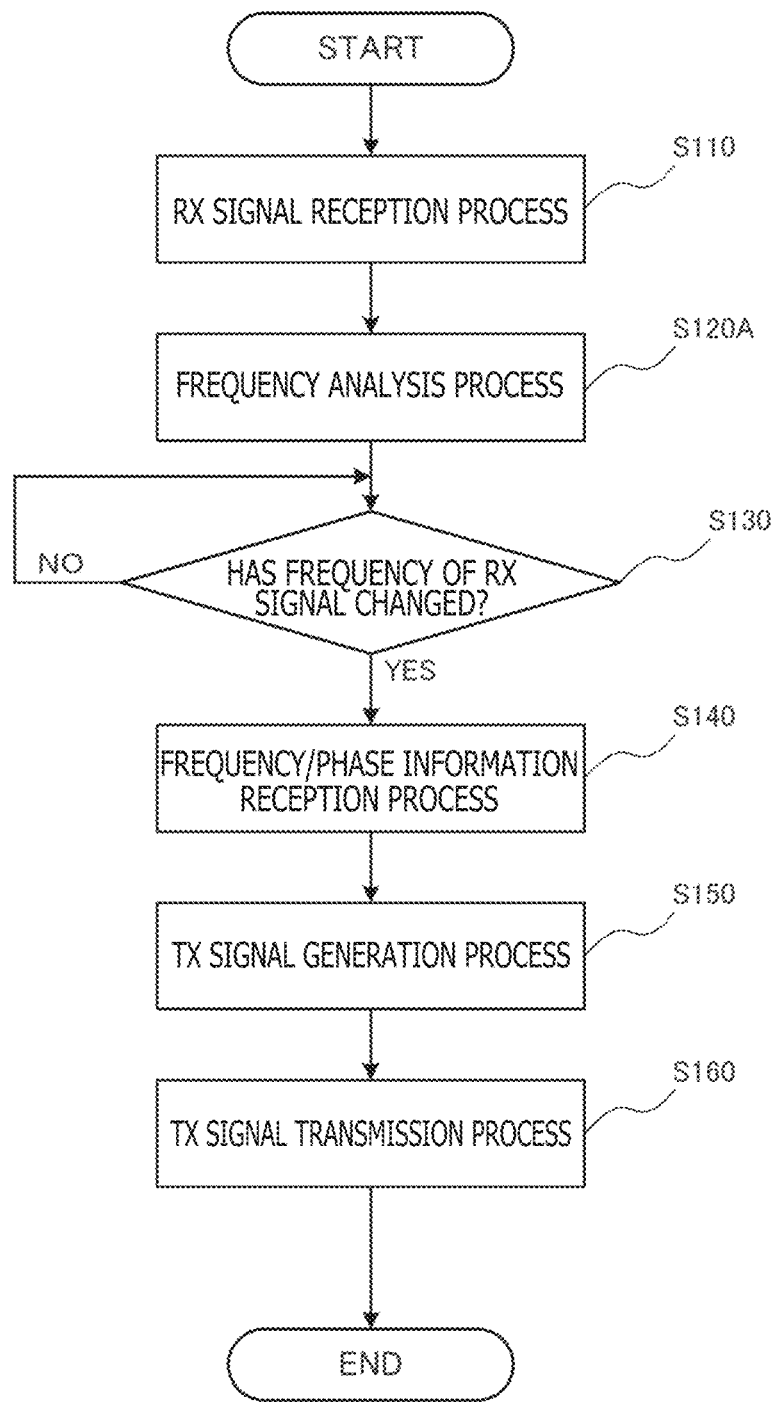
FIG. 10 is a process flow chart of the position detector according to the second embodiment of the present disclosure.

The frequency analysis unit 113A executes, for example, the discrete Fourier transform process of six frequencies with respect to one input and outputs the processing results as digital data of peak values of the pen signal at the frequencies as illustrated in FIG. 9.

That is, in relation to the peak values with respect to the frequencies as discrete values, the frequency analysis unit 113A extracts, as the frequency, the discrete value closest to the peak of the peak values when, for example, the frequency indicating the peak of the peak values does not coincide with the frequencies as discrete values.

For example, the frequency indicating the peak of the peak value is D2-3, and the frequency as the closest discrete value is D2 in the example illustrated in FIG. 9. Therefore, the frequency analysis unit 113A extracts D2 as the frequency and sets D2 as the frequency/phase information to be transferred.

Process of Position Detector 1A

A process of the position detector 1A according to the present embodiment will be described with reference to FIG. 10.

A case of starting the process when there is a change in the frequency/phase information of the RX signal will be illustrated and described.

Note that only the timing of starting the process varies in a case of starting the process at the timing before the coordinate calculation process of the position indicator 2, and the other processes are similar.

The control unit 120 causes the signal reception unit to receive the RX signal from the position indicator 2 (step S110).

The RX signal received by the signal reception unit is converted into a desirable digital signal and transmitted to the frequency analysis unit 113A through the control unit 120.

The frequency analysis unit 113A receives the RX signal converted into the digital signal and executes the discrete Fourier transform process.

The frequency analysis unit 113A extracts, as the frequency, the discrete value closest to the peak of the peak values of the pen signal received from the position indicator 2, among the discrete values of the frequency detection and sets the frequency as the execution result of the discrete Fourier transform process.

The frequency analysis unit 113A transfers, to the control unit 120, the frequency/phase information of the RX signal as the execution result of the discrete Fourier transform process (step S120A).

In this case, the control unit 120 stores, in the memory, the frequency/phase information of the RX signal obtained from the frequency analysis unit 113A.

The control unit 120 compares the frequency/phase information of the RX signal in the memory and the frequency/phase information of the RX signal obtained from the frequency analysis unit 113A and determines whether or not the frequency/phase information of the RX signal has changed (step S130).

If the control unit 120 determines that the frequency/phase information of the RX signal has not changed after comparing the frequency/phase information of the RX signal in the memory and the frequency/phase information of the RX signal obtained from the frequency analysis unit 113A ("NO" in step S130), the control unit 120 restores the process and shifts to the standby mode.

If the control unit 120 determines that the frequency/phase information of the RX signal has changed after comparing the frequency/phase information of the RX signal in the memory and the frequency/phase information of the RX signal obtained from the frequency analysis unit 113A

("YES" in step S130), the multiplexer 110B receives the frequency/phase information of the RX signal from the frequency analysis unit 113A (step S140).

The signal generation unit 110A generates a plurality of transfer signals with different frequencies.

The multiplexer 110B receives and multiplexes the plurality of transfer signals with different frequencies from the signal generation unit 110A and outputs the TX signal corresponding to the frequency/phase of the RX signal input from the frequency analysis unit 113A (step S150).

The control unit 120 transmits the TX signal to the position indicator 2 through the signal transmission unit.

The TX signal output from the control unit 120 is transmitted to the position detection coil 101 of the position indicator 2 through the switch connection circuit 107 (step S160).

Effects

As described above, the signal processing circuit 102A of the position detector 1A according to the present embodiment is configured to perform the frequency analysis of the plurality of discrete frequencies, and the signal processing circuit 102A extracts, as the frequency, the discrete value closest to the peak of the peak values of the pen signal received from the position indicator 2, among the discrete values of the frequency detection.

That is, when, for example, the frequency indicating the peak of the peak values is D2-3 as illustrated in FIG. 9, the signal processing circuit 102A sets the frequency indicating the peak of the peak values to the closest discrete value D2.

Here, the intervals of the discrete values are sufficiently small. Therefore, the frequency information indicating the peak of the peak values is set to D2, and the frequency information is transmitted to the multiplexer 110B. The signal generation unit 110A outputs the TX signal. This can expect an advantageous effect of suppressing the reduction in the S/N of the pen signal transferred from the position indicator 2 even if the pen pressure is generated in the position indicator 2.

Since the advantageous effect of suppressing the reduction in the S/N of the pen signal transferred from the position indicator 2 can be expected, an advantageous effect of suppressing the reduction in the position detection accuracy of the position indicator 2 can be expected.

Since the advantageous effect of suppressing the reduction in the S/N of the pen signal transferred from the position indicator 2 can be expected, an advantageous effect of suppressing the reduction in the detection accuracy of the pen pressure in the position indicator 2 can be expected.

Third Embodiment

Figure 11:
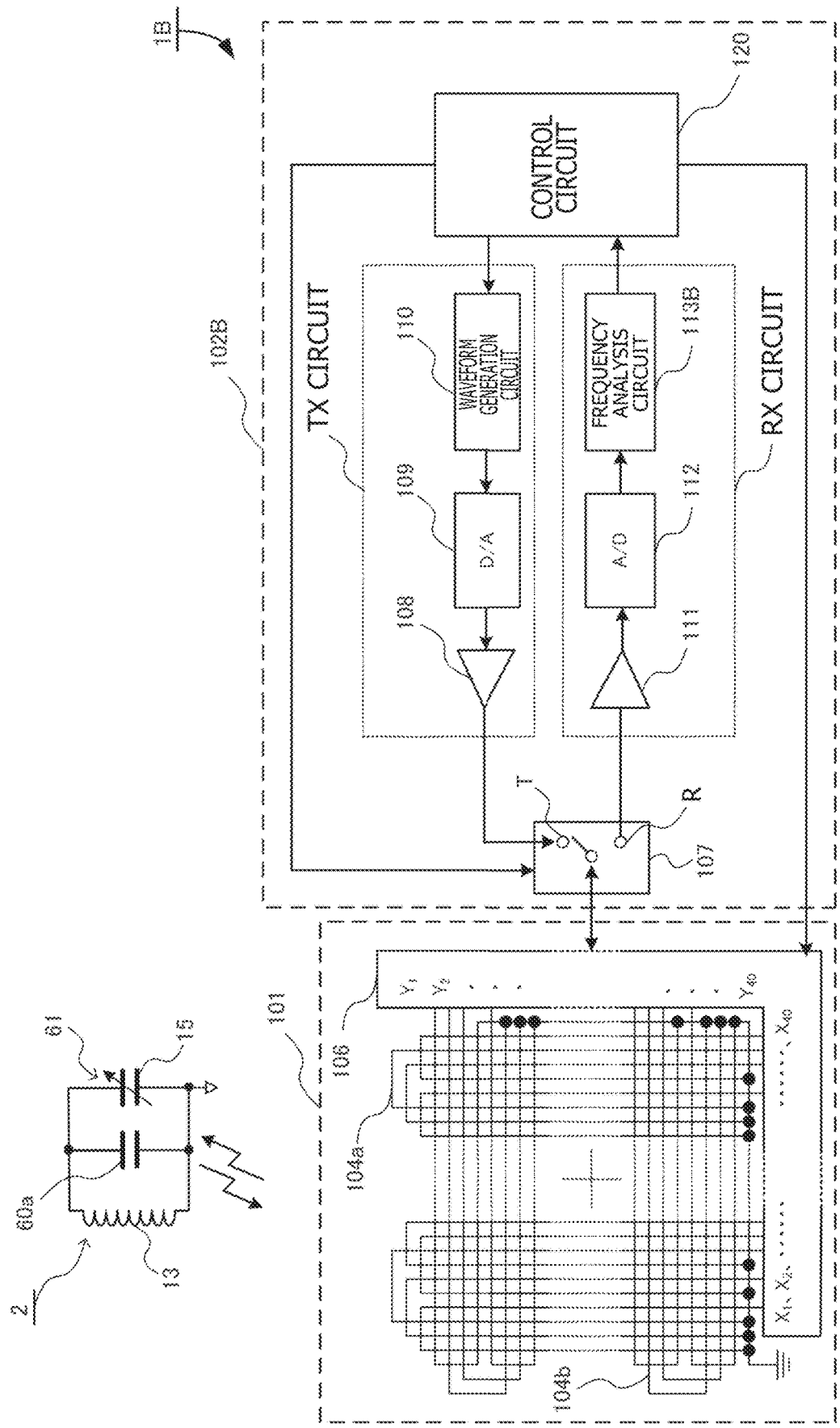
FIG. 11 depicts a configuration of an input apparatus according to a third embodiment of the present disclosure.

A position detector 1B of the present embodiment will be described with reference to FIGS. 11 to 13.

Note that only the configuration of a frequency analysis unit 113B in the position detector 1B of the present embodiment is different from the position detectors 1 and 1A of the first and second embodiments, and only the matters regarding the frequency analysis unit 113B will be described.

Configuration of Signal Processing Circuit 102B

As illustrated in FIG. 8, a signal processing circuit 102B of the position detector 1A according to the present embodiment includes the switch connection circuit 107, the transmission amplifier 108, the D/A conversion circuit 109, the waveform generation unit 110, the reception amplifier 111, the A/D conversion circuit 112, the frequency analysis unit 113B, and the control unit 120.

Note that the constituent elements provided with the same reference signs as those of the first and second embodiments have similar functions, and the constituent elements will not be described in detail.

When the frequency indicating the peak of the peak values of the pen signal received from the position indicator 2 does not coincide with the discrete values of the frequency detection, the frequency analysis unit 113B performs an interpolation operation of the frequency with the peak value indicating the peak and adjacent discrete values of the frequency detection and extracts the frequency.

The frequency analysis unit 113B executes, for example, the discrete Fourier transform process of six frequencies with respect to one input and outputs the processing results as digital data of peak values of the pen signal at the frequencies as illustrated in FIG. 3.

Figure 12:
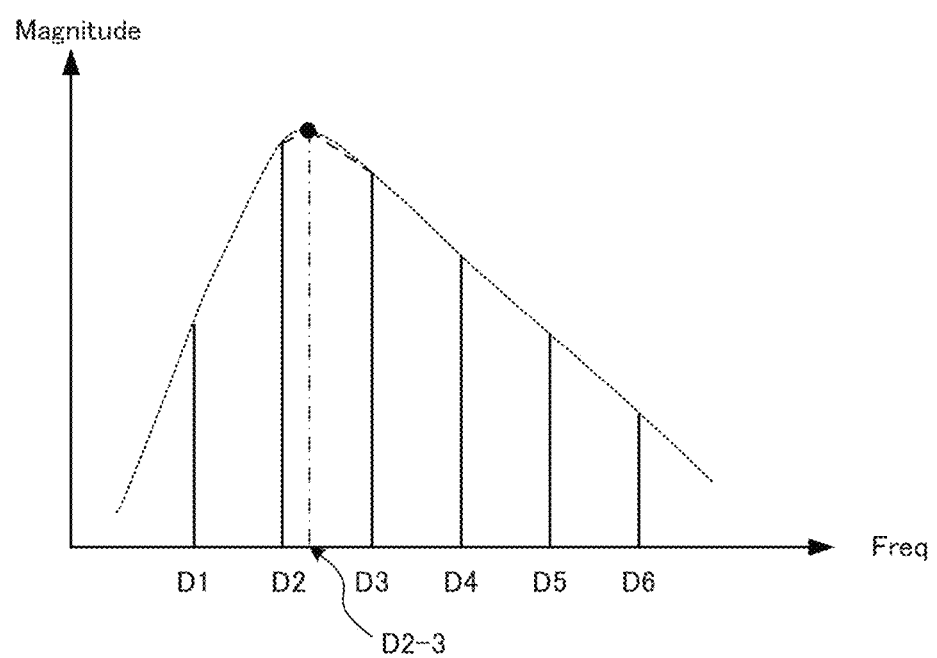
FIG. 12 depicts a relation between output from a frequency analysis unit of a position detector and frequency/phase information transmitted to a multiplexer according to the third embodiment of the present disclosure.
Figure 13:
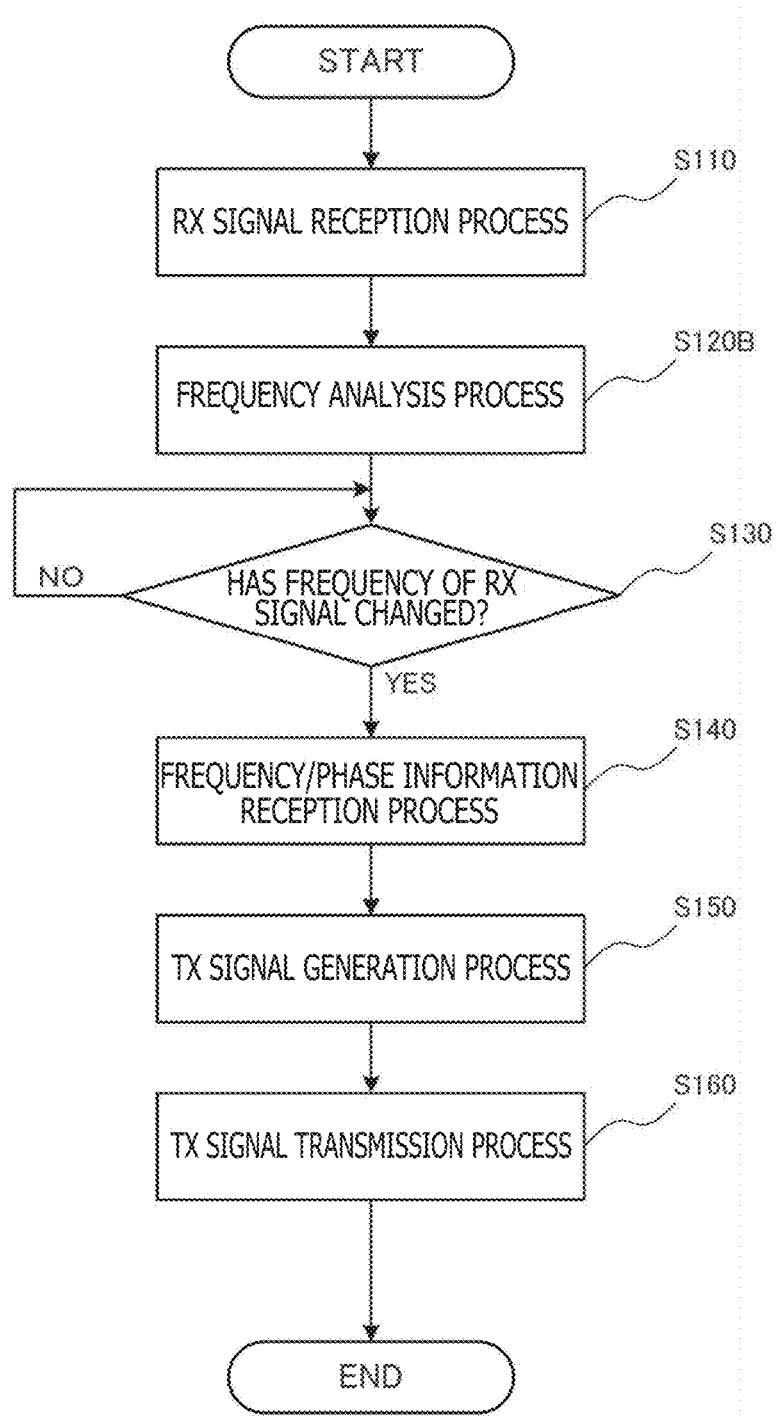
FIG. 13 is a process flow chart of the position detector according to the third embodiment of the present disclosure.
Figure 14A:
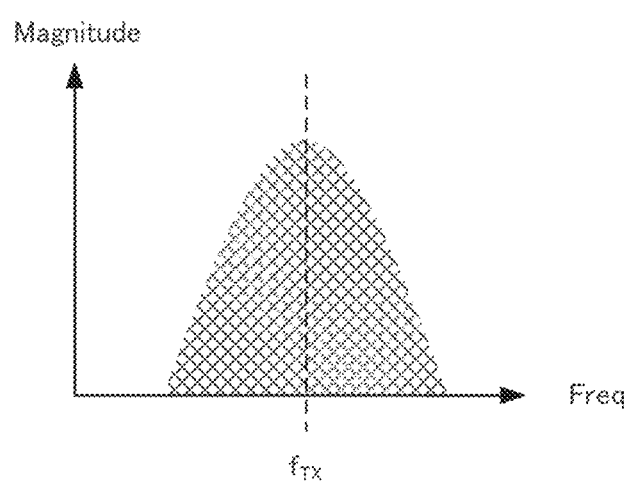
FIG. 14A is a diagram illustrating frequency characteristics of a TX signal according to a conventional example.
Figure 14B:
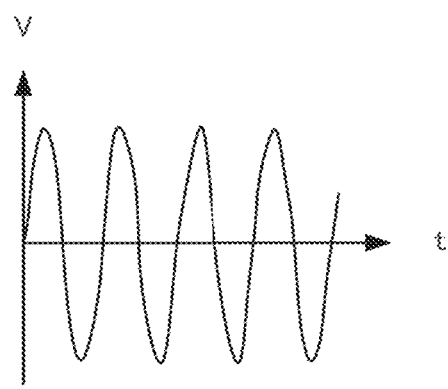
FIG. 14B is a diagram illustrating a voltage waveform of the TX signal according to the conventional example.
Figure 15A:
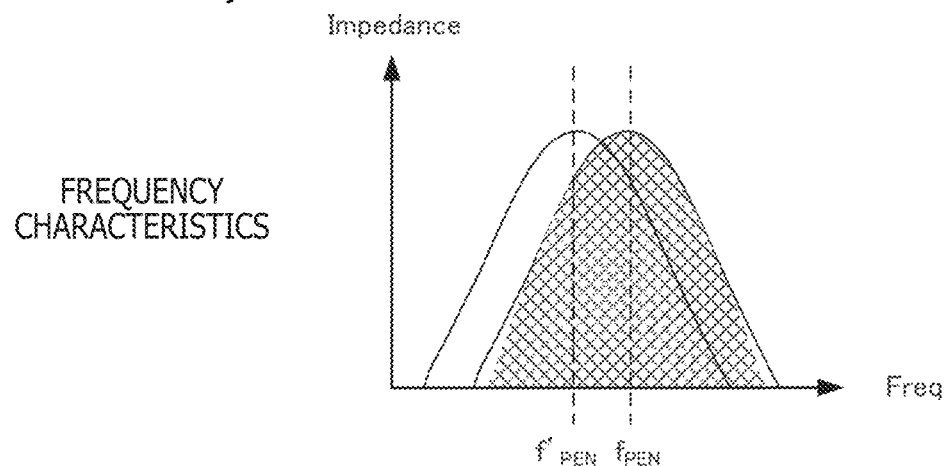
FIG. 15A is a diagram illustrating frequency characteristics of an RX signal according to the conventional example.
Figure 15B:
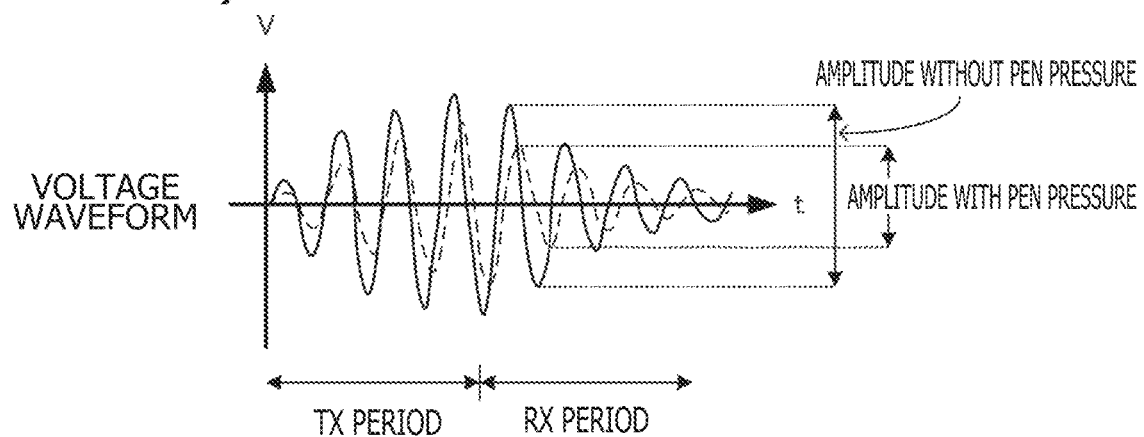
FIG. 15B is a diagram illustrating a voltage waveform of the RX signal according to the conventional example.

For example, the frequency indicating the peak of the peak values is D2-3 in the example illustrated in FIG. 12.

The frequency analysis unit 113B performs an interpolation operation of three points including the frequency (D2-3) with the peak value indicating the peak and adjacent discrete values (D2 and D3) of the frequency detection and extracts the frequency (D2-3) with the peak value indicating the peak.

Process of Position Detector 1B

A process of the position detector 1B according to the present embodiment will be described with reference to FIG. 13.

A case of starting the process when there is a change in the frequency/phase information of the RX signal will be illustrated and described.

Note that only the timing of starting the process varies in a case of starting the process at the timing before the coordinate calculation process of the position indicator 2, and the other processes are similar.

The control unit 120 causes the signal reception unit to receive the RX signal from the position indicator 2 (step S110).

The RX signal received by the signal reception unit is converted into a desirable digital signal and transferred to the frequency analysis unit 113B through the control unit 120.

The frequency analysis unit 113B receives the RX signal converted into the digital signal and executes the discrete Fourier transform process.

When the frequency indicating the peak of the peak values of the pen signal received from the position indicator 2 does not coincide with the discrete values of the frequency detection, the frequency analysis unit 113B performs the interpolation operation of the frequency with the peak value indicating the peak and the adjacent discrete values of the frequency detection and extracts the frequency.

The frequency analysis unit 113B transfers, to the control unit 120, the frequency/phase information of the RX signal as the execution result of the discrete Fourier transform process (step S120B).

In this case, the control unit 120 stores, in the memory, the frequency/phase information of the RX signal obtained from the frequency analysis unit 113B.

The control unit 120 compares the frequency/phase information of the RX signal in the memory and the frequency/phase information of the RX signal obtained from the frequency analysis unit 113B and determines whether or not the frequency/phase information of the RX signal has changed (step S130).

If the control unit 120 determines that the frequency/phase information of the RX signal has not changed after comparing the frequency/phase information of the RX signal in the memory and the frequency/phase information of the RX signal obtained from the frequency analysis unit 113B ("NO" in step S130), the control unit 120 restores the process and shifts to the standby mode.

If the control unit 120 determines that the frequency/phase information of the RX signal has changed after comparing the frequency/phase information of the RX signal in the memory and the frequency/phase information of the RX signal obtained from the frequency analysis unit 113B ("YES" in step S130), the multiplexer 110B receives the frequency/phase information of the RX signal from the frequency analysis unit 113B (step S140).

The signal generation unit 110A generates a plurality of transfer signals with different frequencies.

The multiplexer 110B receives and multiplexes the plurality of transfer signals with different frequencies from the signal generation unit 110A and outputs the TX signal corresponding to the frequency/phase of the RX signal input from the frequency analysis unit 113B (step S150).

The control unit 120 transmits the TX signal to the position indicator 2 through the signal transmission unit.

The TX signal output from the control unit 120 is transmitted to the position detection coil 101 of the position indicator 2 through the switch connection circuit 107 (step S160).

Effects

As described above, the signal processing circuit 102B of the position detector 1A according to the present embodiment performs the interpolation operation of the frequency with the peak value indicating the peak and the adjacent discrete values of the frequency detection and extracts the frequency when the frequency with the peak value indicating the peak of the pen signal received from the position indicator 2 does not coincide with the discrete values of the frequency detection.

That is, when, for example, the frequency indicating the peak of the peak values is D2-3 as illustrated in FIG. 12, the signal processing circuit 102B performs the interpolation operation at three points including the frequency (D2-3) with the peak value indicating the peak and the adjacent discrete values (D2 and D3) of the frequency detection and extracts the frequency (D2-3) with the peak value indicating the peak.

Therefore, the reduction in the S/N of the pen signal transferred from the position indicator 2 can be suppressed by extracting the frequency (D2-3) indicating the peak of the peak value close to the true value even if the pen pressure is generated in the position indicator 2.

Since the reduction in the S/N of the pen signal transferred from the position indicator 2 can be suppressed, the reduction in the position detection accuracy of the position indicator 2 can be suppressed.

Since the reduction in the S/N of the pen signal transferred from the position indicator 2B can be suppressed, the reduction in the detection accuracy of the pen pressure in the position indicator 2B can be suppressed.

Fourth Embodiment

The position detector 1 of the present embodiment will be described with reference to FIGS. 1, 3, 4A, 4B, 6, 7A, 7B, 16, and 17.

Note that the input apparatus including the position detector 1 of the present embodiment will be illustrated to describe the position detector 1 of the present embodiment.
Configuration of Input Apparatus As illustrated in FIG. 1, the input apparatus includes the position detector 1 of the present embodiment and the position indicator 2.
Configuration of Position Indicator 2

The position indicator 2 is configured to use the electromagnetic resonance system to indicate the position of the position indicator 2 to the position detector 1.

As illustrated in FIG. 1, the position indicator 2 includes the resonant circuit 61 including: the position indication coil 13; the resonant capacitor 60a connected in parallel to the position indication coil 13; and the variable capacitor 15 connected in parallel to the resonant capacitor 60a.

The resonant circuit 61 including the variable capacitor 15 resonates with the transfer signal received from the position detector 1 described later, to deliver the energy.

The position indicator 2 transmits the resonance signal detected by the resonant circuit 61 to the position detector 1, to thereby indicate the position of the position indicator 2 to the position detector 1.
Configuration of Position Detector 1

The position detector 1 includes the position detection coil 101 and the signal processing circuit 102.

The X-axis direction loop coil group 104a and the Y-axis direction loop coil group 104b as a sensor are layered in the position detection coil 101.

The X-axis direction loop coil group 104a and the Y-axis direction loop coil group 104b form the position detection coil 101.

Each of the loop coil groups 104a and 104b includes, for example, 40 rectangular loop coils.

The loop coils included in the loop coil groups 104a and 104b are lined up at equal intervals and sequentially arranged on top of each other.

The position detector 1 includes the selection circuit 106 connected to the X-axis direction loop coil group 104a and the Y-axis direction loop coil group 104b.

The selection circuit 106 sequentially selects one loop coil of the two loop coil groups 104a and 104b.

The signal processing circuit 102 includes the switch connection circuit 107, the transmission amplifier 108, the D/A conversion circuit 109, the waveform generation unit 110, the reception amplifier 111, the A/D conversion circuit 112, the frequency analysis unit 113, and the control unit 120.

The constituent block including the transmission amplifier 108, the D/A conversion circuit 109, and the waveform generation unit 110 will be referred to as a "TX unit," and the constituent block including the reception amplifier 111, the A/D conversion circuit 112, and the frequency analysis unit 113 will be referred to as an "RX unit."

The switch connection circuit 107 switches the connection points (transmission side terminal T and reception side terminal R in FIG. 1) to be connected to the loop coils selected by the selection circuit 106 based on the control signal from the control unit 120 described later.

The transmission amplifier 108 is connected to the transmission side terminal T of the connection points, and the reception amplifier 111 is connected to the reception side terminal R.

The waveform generation unit 110 generates the transfer signal (hereinafter, referred to as a "TX signal") to be supplied to the transfer coil 104 as the position detection coil 101 as illustrated in FIG. 4A based on the control signal obtained from the frequency analysis unit 113 described later through the control unit 120 described later.

Figure 16:
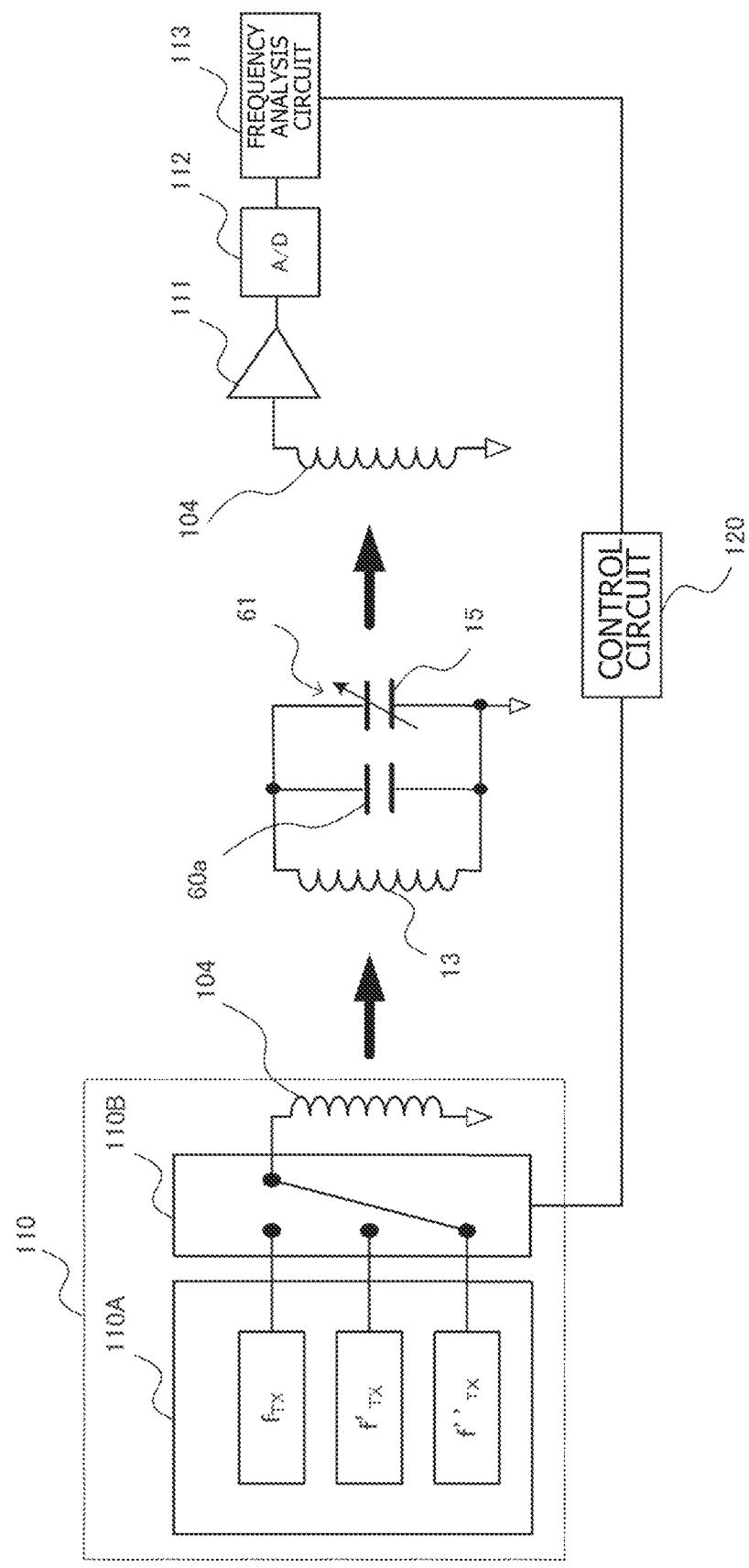
FIG. 16 depicts an operating principle of a position detector according to a fourth embodiment of the present disclosure.

The waveform generation unit 110 includes the signal generation unit 110A and the multiplexer (MUX) 110B as illustrated in FIG. 16.

The signal generation unit 110A includes a plurality of signal generators that generate a plurality of transfer signals with different frequencies.

The signal generation unit 110A generates, for example, a plurality of transfer signals with three different frequencies fTX, f'TX, and f"TX as illustrated in FIG. 16.

The output ends of the plurality of signal generators of the signal generation unit 110A are separately connected to the plurality of input ends of the multiplexer 110B and connected to the output end of the multiplexer 110B based on the control signal from the control unit 120 described later.

The multiplexer 110B receives and multiplexes the plurality of transfer signals with different frequencies from the signal generation unit 110A and outputs the TX signal with a unique frequency.

Specifically, the multiplexer 110B outputs the TX signal corresponding to the frequency/phase of the pen signal (hereinafter, referred to as an "RX signal") input from the frequency analysis unit 113 described later based on one frequency/phase information of the RX signal that is analyzed by the frequency analysis unit 113 described later and that is detected by the detection coil 104 as the position detection coil 101.

The analog voltage waveform of the TX signal transferred to the position detector 1 through the transfer coil 104 as the position detection coil 101 is as illustrated in FIG. 4B.

The digital signal output from the waveform generation unit 110 is converted into the analog signal by the D/A conversion circuit 109 and amplified by the transmission amplifier 108. The signal is supplied to the transmission side terminal T of the switch connection circuit 107.

The RX signal detected by the detection coil 104 as the position detection coil 101 is amplified by the reception amplifier 111 through the reception side terminal R of the switch connection circuit 107 and converted into the digital signal by the A/D conversion circuit 112. The signal is supplied to the frequency analysis unit 113.

The frequency analysis unit 113 receives the RX signal converted into the digital signal and executes the discrete Fourier transform process.

The frequency analysis unit 113 outputs, to the control unit 120 described later, the frequency/phase information of the RX signal as an execution result of the discrete Fourier transform process.

The frequency analysis unit 113 is, for example, a DFT with one input and six outputs as illustrated in FIG. 3 and is configured to perform the frequency analysis of a plurality of discrete frequencies.

The result of the frequency analysis by the frequency analysis unit 113 is fed back as a control signal to the multiplexer 110B of the waveform generation unit 110 through the control unit 120 as illustrated in FIG. 16.

The control unit 120 controls the entire signal processing circuit 102 based on, for example, the control program stored in the ROM not illustrated.

Specifically, the control unit 120 controls the RX signal reception process, the discrete Fourier transform process in the frequency analysis unit 113, the reception process of the frequency/phase information, the signal multiplexing process in the multiplexer 110B, the signal generation process in the signal generation unit 110A, the transmission process of the TX signal, etc.

The control unit 120 stores, in the memory, the frequency/phase information of the RX signal obtained from the frequency analysis unit 113.

The control unit 120 causes the waveform generation unit 110 to generate, on the basis of the RX signal obtained from the frequency analysis unit 113, that is, the pen signal generated by the position indicator 2, the transfer signal with the frequency that varies according to the frequency of the pen signal.

The control unit 120 controls the action of the multiplexer 110B to transfer the alternating magnetic field to the position indicator 2 through the sensor (104a and 104b).

The control unit 120 controls the action of the multiplexer 110B to generate the transfer signal corresponding to the change in the frequency when the frequency of the pen signal generated by the position indicator 2 has changed from the frequency of the detected pen signal.

The control unit 120 controls the action of the multiplexer 110B to generate the transfer signal at the timing before the start of the coordinate calculation process of the position indicator 2.

The control unit 120 causes the multiplexer 110B to generate the transfer signal a plurality of times in one coordinate calculation process and controls the action of the multiplexer 110B to continuously generate the transfer signal with the same frequency at least during the plurality of times of the generation of the transfer signal in one coordinate calculation process.

The control unit 120 calculates the coordinate values of the indicated position in the X-axis direction and the Y-axis direction of the position indicator 2 based on the level of the voltage value of the voltage that is induced by the pen signal transmitted from the position indicator 2 and that is generated in each loop coil of the X-axis direction loop coil group 104a and the Y-axis direction loop coil group 104b.

The control unit 120 detects the pen pressure based on the phase difference between the transmitted transfer signal and the received pen signal.

Process of Position Detector 1

Figure 17:
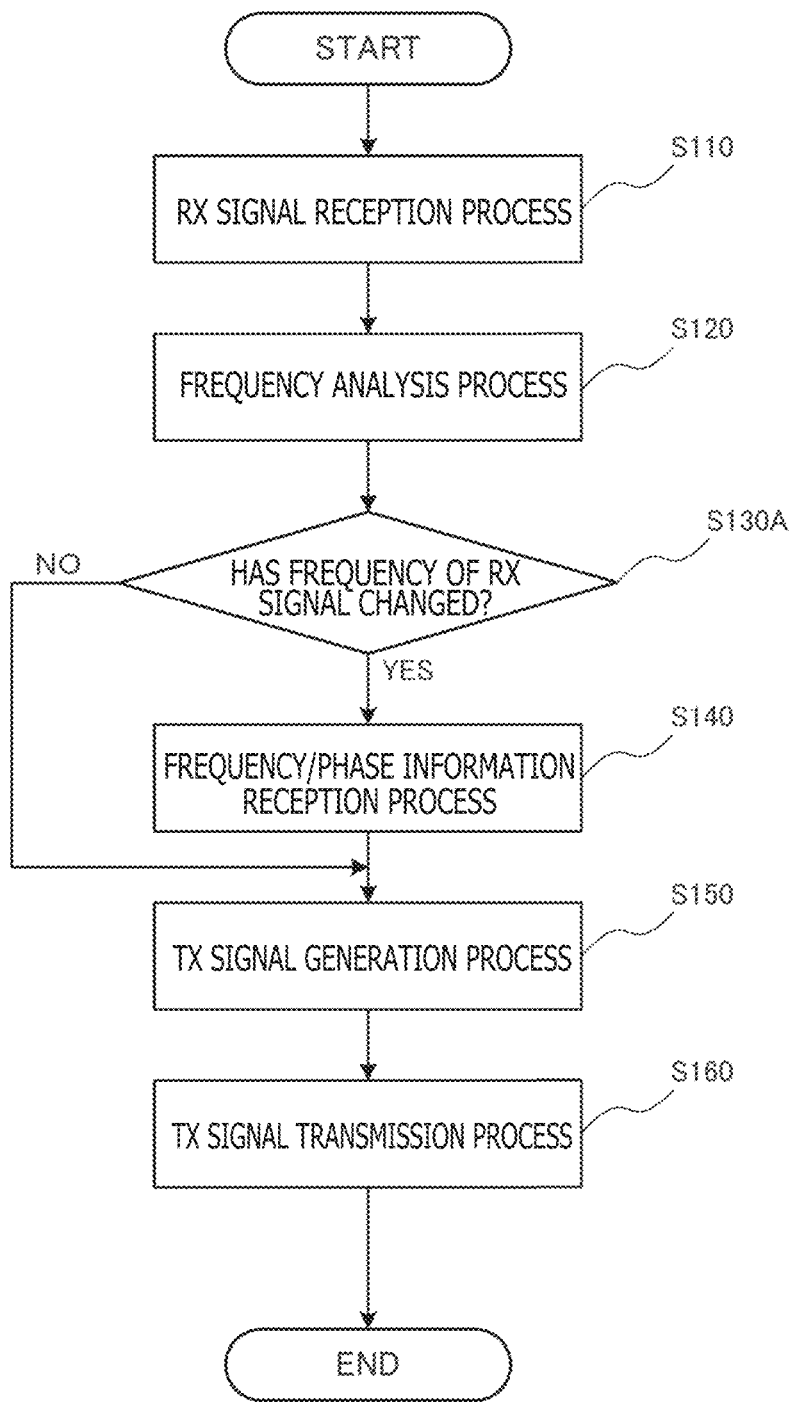
FIG. 17 is a process flow chart of the position detector according to the fourth embodiment of the present disclosure.

A process of the position detector 1 according to the present embodiment will be described with reference to FIGS. 17 and 6.

Note that a case of starting the process when the frequency/phase information of the RX signal has changed and a case of starting the process at the timing before the coordinate calculation process of the position indicator 2 will be separately described.

Case of Starting Process when Frequency/Phase Information of RX Signal has Changed The case of starting the process when the frequency/phase information of the RX signal has changed will be described with reference to FIG. 17.

The control unit 120 causes the signal reception unit to receive the RX signal from the position indicator 2 (step S110).

The RX signal received by the signal reception unit is converted into a desirable digital signal and transferred to the frequency analysis unit 113 through the control unit 120.

The frequency analysis unit 113 receives the RX signal converted into the digital signal and executes the discrete Fourier transform process.

The frequency analysis unit 113 transfers, to the control unit 120, the frequency/phase information of the RX signal as an execution result of the discrete Fourier transform process (step S120).

In this case, the control unit 120 stores, in the memory, the frequency/phase information of the RX signal obtained from the frequency analysis unit 113.

The control unit 120 compares the frequency/phase information of the RX signal in the past and the frequency/phase information of the RX signal obtained this time from the frequency analysis unit 113 and determines whether or not the frequency/phase information of the RX signal has changed (step S130A).

If the control unit 120 determines that the frequency/phase information of the RX signal has changed after comparing the frequency/phase information of the RX signal in the past and the frequency/phase information of the RX signal obtained from the frequency analysis unit 113 ("YES" in step S130A), the control unit 120 transmits, to the multiplexer 110B, the frequency/phase information of the RX signal from the frequency analysis unit 113, and the multiplexer 110B receives the transmitted frequency/phase information of the RX signal (step S140).

On the other hand, if the control unit 120 determines that the frequency/phase information of the RX signal has not changed after comparing the frequency/phase information of the RX signal in the memory and the frequency/phase information of the RX signal obtained from the frequency analysis unit 113 ("NO" in step S130A), the control unit 120 does not execute the process of step S140 and executes a process of step S150 described later.

The signal generation unit 110A generates a plurality of transfer signals with different frequencies.

The multiplexer 110B receives and multiplexes the plurality of transfer signals with different frequencies from the signal generation unit 110A and outputs the TX signal corresponding to the frequency/phase of the RX signal input from the frequency analysis unit 113 (step S150).

The control unit 120 transmits the TX signal to the position indicator 2 through the signal transmission unit.

The TX signal output from the control unit 120 is transmitted to the position detection coil 101 of the position indicator 2 through the switch connection circuit 107 (step S160).

Case of Starting Process at Timing Before Coordinate Calculation Process of Position Indicator 2

The case of starting the process at the timing before the coordinate calculation process of the position indicator 2 will be described with reference to FIG. 6.

The control unit 120 causes the signal reception unit to receive the RX signal from the position indicator 2 (step S110).

The RX signal received by the control unit 120 is converted into a desirable digital signal.

The control unit 120 determines whether or not the current processing mode is at the timing before the coordinate detection process (step S170).

If the control unit 120 determines that the current processing mode is not at the timing before the coordinate detection process ("NO" in step S170), the control unit 120 restores the process and shifts to the standby mode.

If the control unit 120 determines that the current processing mode is at the timing before the coordinate detection process ("YES" in step S170), the RX signal received by the signal reception unit is converted into a desirable digital signal and transferred to the frequency analysis unit 113 through the control unit 120.

The frequency analysis unit 113 receives the RX signal converted into the digital signal from the control unit 120 and executes the discrete Fourier transform process.

The frequency analysis unit 113 transfers, to the multiplexer 110B, the frequency/phase information of the RX signal as an execution result of the discrete Fourier transform process (step S120).

In this case, the control unit 120 stores, in the memory, the frequency/phase information of the RX signal obtained from the frequency analysis unit 113.

The multiplexer 110B receives the frequency/phase information of the RX signal from the frequency analysis unit 113 (step S140).

The signal generation unit 110A generates a plurality of transfer signals with different frequencies.

The multiplexer 110B receives and multiplexes the plurality of transfer signals with different frequencies from the signal generation unit 110A and outputs the TX signal corresponding to the frequency/phase of the RX signal input from the frequency analysis unit 113 (step S150).

The control unit 120 transmits the TX signal to the position indicator 2 through the signal transmission unit.

The TX signal output from the control unit 120 is transmitted to the position detection coil 101 of the position indicator 2 through the switch connection circuit 107 (step S160).

Effects

As described above, the position detector 1 of the present embodiment includes: the sensor (for example, X-axis direction loop coil group 104a and Y-axis direction loop coil group 104b) provided with a plurality of electrodes; and the signal processing circuit 102 connected to the sensor (for example, X-axis direction loop coil group 104a and Y-axis direction loop coil group 104b) and configured to detect the pen signal generated by the position indicator 2, generate the transfer signal with the frequency that varies according to the frequency of the detected pen signal, and transfer the alternating magnetic field to the position indicator 2 through the sensor (for example, X-axis direction loop coil group 104a and Y-axis direction loop coil group 104b).

That is, the signal processing circuit 102 of the position detector 1 according to the present embodiment detects the pen signal generated by the position indicator 2, generates the transfer signal with the frequency that varies according to the frequency of the detected pen signal, and transfers the alternating magnetic field to the position indicator 2 through the sensor (for example, X-axis direction loop coil group 104a and Y-axis direction loop coil group 104b).

For example, the position detector 1 of the present embodiment generates the transfer signal with the frequency that varies according to the behavior of the position indicator 2, such as whether or not there is a pen pressure in the position indicator 2, and transfers the transfer signal to the position indicator 2.

More specifically, the position detector 1 of the present embodiment transfers, to the position indicator 2, the transfer signal with the frequency corresponding to the frequency transferred from the position indicator 2 as illustrated in FIG. 4A, for example.

Therefore, the resonance energy supplied to the position indicator 2 is maintained regardless of whether or not there is a pen pressure in the position indicator 2, and the amplitude of the voltage waveform transferred from the position indicator 2 is also maintained as illustrated in FIG. 4B.

In the conventional position indicator 2, when the resonance frequency becomes fPEN due to the pen pressure, the position indicator 2 can obtain only the resonance energy based on the frequency characteristics of fTX, and the resonance signal is attenuated.

In the present embodiment, the position indicator 2 can obtain the resonance energy based on the frequency characteristics of f"TX, and the resonance signal is not attenuated as illustrated in FIGS. 7A and 7B. The position indicator 2 can obtain the resonance signal equivalent to when there is no pen pressure.

Therefore, the reduction in the S/N of the pen signal transferred from the position indicator 2 can be suppressed even if the pen pressure is generated in the position indicator 2.

Since the reduction in the S/N of the pen signal transferred from the position indicator 2 can be suppressed, the reduction in the position detection accuracy of the position indicator can be suppressed.

Since the reduction in the S/N of the pen signal transferred from the position indicator 2 can be suppressed, the reduction in the detection accuracy of the pen pressure in the position indicator 2 can be suppressed.

Since the resonance energy supplied to the position indicator 2 is optimized, an improvement in the position detection accuracy of the position indicator 2 in, for example, the hover state can also be expected.

Since the resonance energy supplied to the position indicator 2 is optimized, the reduction in the S/N of the pen signal transferred from the position indicator 2 can be suppressed even if, for example, a magnet or metal housing or the like is deteriorated over time or even if the value of the position indication coil or the resonant capacitor included in the resonant circuit in the position indicator 2 is changed by environmental conditions or the like.

The signal processing circuit 102 of the position detector 1 according to the present embodiment generates the transfer signal corresponding to the change in the frequency when the frequency of the pen signal generated by the position indicator 2 has changed from the frequency of the detected pen signal.

That is, the signal processing circuit 102 of the position detector 1 according to the present embodiment generates the transfer signal corresponding to the change in the frequency of the pen signal generated by the position indicator 2.

For example, the position detector 1 of the present embodiment generates the transfer signal corresponding to the frequency changed according to the behavior of the position indicator 2, such as whether or not there is a pen pressure in the position indicator 2.

More specifically, the position detector 1 of the present embodiment transfers, to the position indicator 2, the transfer signal with the frequency corresponding to the frequency transferred from the position indicator 2 as illustrated in FIG. 4A, for example.

Therefore, the resonance energy supplied to the position indicator 2 is maintained regardless of whether or not there is a pen pressure in the position indicator 2, and the amplitude of the voltage waveform transferred from the position indicator 2 is also maintained as illustrated in FIG. 4B.

In the conventional position indicator 2, when the resonance frequency becomes f'PEN due to the pen pressure, the position indicator 2 can obtain only the resonance energy based on the frequency characteristics of fTX, and the resonance signal is attenuated.

In the present embodiment, the position indicator 2 can obtain the resonance energy based on the frequency characteristics of f"TX, and the resonance signal is not attenuated as illustrated in FIGS. 7A and 7B. The position indicator 2 can obtain the resonance signal equivalent to when there is no pen pressure.

Therefore, the reduction in the S/N of the pen signal transferred from the position indicator 2 can be suppressed even if the pen pressure is generated in the position indicator 2.

Since the reduction in the S/N of the pen signal transferred from the position indicator 2 can be suppressed, the reduction in the position detection accuracy of the position indicator can be suppressed.

Since the reduction in the S/N of the pen signal transferred from the position indicator 2 can be suppressed, the reduction in the detection accuracy of the pen pressure in the position indicator 2 can be suppressed.

The signal processing circuit 102 of the position detector 1 according to the present embodiment generates the transfer signal at the timing before the start of the coordinate calculation process of the position indicator 2.

That is, the reduction in the S/N of the pen signal transferred from the position indicator 2 most significantly affects the coordinate calculation process of the position indicator 2.

However, the signal processing circuit 102 of the position detector 1 according to the present embodiment generates the transfer signal at the timing before the start of the coordinate calculation process of the position indicator 2.

Therefore, in the coordinate calculation process of the position indicator 2, the pen signal transferred from the position indicator 2 with suppressed reduction in S/N can be used to execute the coordinate calculation process.

The signal processing circuit 102 of the position detector 1 according to the present embodiment generates the transfer signal at the timing before the start of the coordinate calculation process of the position indicator 2.

Therefore, the start timing of the waveform generation unit 110 and the D/A conversion circuit 109 can be optimized to minimize the power consumption of the waveform generation unit 110 and the D/A conversion circuit 109.

Thus, even if the pen pressure is generated in the position indicator 2, the power consumption can be minimized, and the reduction in the S/N of the pen signal transferred from the position indicator 2 can be suppressed.

Since the reduction in the S/N of the pen signal transferred from the position indicator 2 can be suppressed, the reduction in the position detection accuracy of the position indicator can be suppressed.

Since the reduction in the S/N of the pen signal transferred from the position indicator 2 can be suppressed, the reduction in the detection accuracy of the pen pressure in the position indicator 2 can be suppressed.

The signal processing circuit 102 of the position detector 1 according to the present embodiment is configured to generate the transfer signal a plurality of times in one coordinate calculation process, and the signal processing circuit 102 continuously generates the transfer signal with the same frequency at least during the plurality of times of the generation of the transfer signal in one coordinate calculation process.

For example, in a case of calculating the coordinates of the position indicator 2 in N×N areas of the sensor, that is, in one coordinate calculation process, N X-sensors and N Y-sensors are sensed, that is, the process of generating the transfer signal a plurality of times is executed. The calculation process of the coordinates is executed on the basis of the reception strength distribution of the sensor.

If the frequency of the transfer signal is changed during the sensing of the N X-sensors and the N Y-sensors, that is, during the plurality of times of the generation of the transfer signal in one coordinate calculation process, the amplitude level of the pen signal is changed, and accurate coordinates may not be calculated.

Therefore, the signal processing circuit 102 is configured to generate the transfer signal a plurality of times in one coordinate calculation process, and the signal processing circuit 102 continuously generates the transfer signal with the same frequency at least during the plurality of times of the generation of the transfer signal in one coordinate calculation process. This can prevent the adverse effect of the dynamic change in frequency.

Although the sensor includes the rectangular coils intersecting with each other in the first and second directions in a two-dimensional space and arrayed on one substrate in the illustrated embodiments, the arrangement is not limited to this.

For example, although the transfer coils for generating the alternating magnetic field for the position indicator 2 and the detection coils for detecting the pen signal generated by the position indicator 2 are the same coils used in time series in the description, the transfer coils and the detection coils may be different coils.

Furthermore, the transfer coils and the detection coils may be separated and provided on different substrates, for example.

In this case, the detection coils in one layer may detect the pen signal, and the transfer coils provided in another layer may generate the alternating magnetic field with the frequency corresponding to (following) the frequency of the pen signal.

Furthermore, instead of lining up the rectangular coils in two direction, block-like coils may be two-dimensionally spread over to cover the detection surface, for example.

Furthermore, the plurality of electrodes included in the sensor may not have the loop-like coil shape, and the electrodes may be part of electrodes electromagnetically forming coils.

Specifically, the electrodes may form comb-shaped coils, or two wires may function as coils in a pseudo manner, for example.

Note that the process of the control unit 120 and control units 120A and 120B can be recorded in a recording medium that can be read by a computer system, and the control units 120, 120A, and 120B can read and execute the program recorded in the recording medium to realize the position detectors 1, 1A, and 1B of the present disclosure. The computer system here includes an OS (operating system) or hardware such as a peripheral device.

The "computer system" also includes a website providing environment (or displaying environment) when a WWW (world wide web) system is used. The program may be transmitted from the computer system including a storage device or the like storing the program to another computer system through a transmission medium or through a transmission wave in the transmission medium. The "transmission medium" that transmits the program here denotes a medium with a function of transmitting information, e.g., a network (communication network), such the Internet, or a communication line, such as a telephone line.

The program may be configured to realize part of the functions described above. The program may be what is called a difference file (difference program) that can realize the functions in combination with a program already recorded in the computer system.

Although the embodiments of the disclosure have been described in detail with reference to the drawings, the specific configuration is not limited to the embodiments, and the design and the like within the scope of the disclosure are also included in the specific configuration.

For example, although the position indicator 2 illustrated in the first to fourth embodiments includes an electronic pen, a stylus, or the like, the shape of the position indicator 2 may not be limited to the pen shape.

SUPPLEMENTARY ITEM

A position detector including:
one or a plurality of processors; one or a plurality of memories connected to and capable of communicating with the one or a plurality of processors; and a coil configured to function as a sensor and including a transfer coil that transfers an alternating magnetic field based on a transfer signal to a position indicator, in which
the one or a plurality of processors include
a signal processing circuit connected to the coil and configured to detect a pen signal generated by the position indicator, generate the transfer signal with a frequency based on frequency information of the detected pen signal, and transfer the transfer signal to the transfer coil.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:
1. A position detector, comprising:
a plurality of coils that, in operation, function as a sensor and that includes a transfer coil that, in operation, transfers an alternating magnetic field to a position indicator based on a transfer signal; and
a signal processing circuit connected to the coils, wherein the signal processing circuit, in operation,
detects a pen signal generated by the position indicator,
performs frequency analysis of a plurality of discrete frequencies,
extracts, as a frequency of the transfer signal, a discrete value closest to a peak of peak values of the pen signal received from the position indicator, among discrete values of frequency detection,
generates the transfer signal with the frequency based on frequency information of the pen signal, and
transfers the transfer signal to the transfer coil.
2. The position detector according to claim 1, wherein, when a frequency of the pen signal generated by the position indicator has changed, the signal processing circuit generates the transfer signal corresponding to a change in the frequency of the pen signal.

3. The position detector according to claim 2, wherein the signal processing circuit, in operation, generates the transfer signal before a start of a coordinate calculation process of the position indicator.

4. The position detector according to claim 3, wherein the signal processing circuit, in operation, generates the transfer signal a plurality of times in one iteration of the coordinate calculation process, and the signal processing circuit, in operation, continuously generates the transfer signal with a same frequency at least during the plurality of times that the transfer signal is generated in the one iteration of the coordinate calculation process.

5. The position detector according to claim 1, wherein, when a frequency indicating the peak of the peak values of the pen signal received from the position indicator does not coincide with the discrete values of the frequency detection, the signal processing circuit performs an interpolation operation of the frequency with a peak value indicating the peak and adjacent discrete values of the frequency detection and extracts the frequency.

6. An integrated circuit that detects a position indicated by a position indicator, the integrated circuit comprising:

a plurality of electrodes that, in operation, function as a sensor, wherein the integrated circuit is connected to a coil including a transfer coil that, in operation, transfers an alternating magnetic field based on a transfer signal to the position indicator;

at least one processor; and at least one memory storing at least one program that, when executed by the at least one processor, causes the integrated circuit to:

detect a pen signal generated by the position indicator, perform frequency analysis of a plurality of discrete frequencies, extract, as a frequency of the transfer signal, a discrete value closest to a peak of peak values of the pen signal received from the position indicator, among discrete values of frequency detection, generate the transfer signal with a frequency based on frequency information of the pen signal, and transfer an alternating magnetic field to the position indicator through the coil.

7. A position detection method in a position detector, the position detection method comprising:

transmitting, by the position detector, a first signal to a position indicator;

transmitting, by the position indicator, a second signal to the position detector;

detecting, by the position detector, frequency information from the second signal;

performing, by the position detector, frequency analysis of a plurality of discrete frequencies, extracting, by the position detector, as a frequency of a third signal, a discrete value closest to a peak of peak values of the second signal received from the position indicator, among discrete values of frequency detection, generating, by the position detector, the third signal with the frequency different from a frequency of the first signal based on the frequency information; and transmitting, by the position detector, the third signal to the position indicator.

8. A position detector, comprising:

a plurality of detection coils that, in operation, function as a sensor;

a transfer coil that, in operation, transfers an alternating magnetic field based on a transfer signal to a position indicator; and a signal processing circuit connected to the detection coils and the transfer coil, wherein the signal processing circuit, in operation, detects a pen signal generated by the position indicator, performs frequency analysis of a plurality of discrete frequencies, extracts, as a frequency of the transfer signal, a discrete value closest to a peak of peak values of the pen signal received from the position indicator, among discrete values of frequency detection, generates the transfer signal with the frequency based on frequency information of the pen signal, and transfers the transfer signal to the transfer coil.

* * * * *